United States Patent
Ono

(10) Patent No.: US 11,006,040 B2
(45) Date of Patent: May 11, 2021

(54) ACQUIRE IMAGE WITH ONE COMPONENT OF WAVELENGTH RANGE BY INCLUDING AN INTENTIONAL INTERFERENCE COMPONENT

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/417,668

(22) Filed: May 21, 2019

(65) Prior Publication Data

US 2019/0273862 A1 Sep. 5, 2019

Related U.S. Application Data

(63) Continuation of application No. PCT/JP2017/037512, filed on Oct. 17, 2017.

(30) Foreign Application Priority Data

Nov. 24, 2016 (JP) .............................. JP2016-228101

(51) Int. Cl.
*H04N 5/232* (2006.01)
*G06T 5/50* (2006.01)
(Continued)

(52) U.S. Cl.
CPC ............ *H04N 5/23232* (2013.01); *G06T 5/50* (2013.01); *H04N 5/2258* (2013.01); *H04N 5/232* (2013.01); *H04N 9/09* (2013.01); *H04N 9/093* (2013.01)

(58) Field of Classification Search
CPC ...... H04N 5/23232; H04N 5/232; H04N 9/09; H04N 5/2258; H04N 9/093; G06T 5/50; G06T 2207/10036; G06T 7/33
See application file for complete search history.

(56) References Cited

U.S. PATENT DOCUMENTS

| | | |
|---|---|---|
| 5,880,473 A | 3/1999 | Ginestet |
| 6,763,149 B2 | 7/2004 | Riley et al. |

(Continued)

FOREIGN PATENT DOCUMENTS

| | | |
|---|---|---|
| CN | 104956669 | 9/2015 |
| CN | 105324991 | 2/2016 |

(Continued)

OTHER PUBLICATIONS

R. Zoleikani et al., "Comparison of Pixel and Object Oriented Based Classification of Hyperspectral Pansharpened Images," Journal of the Indian Society of Remote Sensing, Apr. 4, 2016, pp. 25-33.

(Continued)

*Primary Examiner* — Twyler L Haskins
*Assistant Examiner* — Angel L Garces-Rivera
(74) *Attorney, Agent, or Firm* — JCIPRNET

(57) ABSTRACT

The present invention provides an image processing device, an imaging apparatus, and an image processing method capable of acquiring images that are registered with high accuracy and include only a component of a desired wavelength range. In an image processing device according to an aspect of the invention, at least one image is captured with light having a plurality of wavelength ranges not overlapping one another (that is, including an intentional interference component in addition to a principal wavelength range), and at least one wavelength range of the plurality of wavelength ranges is common among the images. Accordingly, it is possible to detect correspondence points among a plurality of images based on information of such a common wavelength range, and to register the plurality of images with high accuracy. In addition, since an influence of light having a wavelength range other than a specific wavelength range is eliminated after registration, it is possible to (Continued)

acquire a plurality of images including only a component of a desired wavelength range.

16 Claims, 18 Drawing Sheets

(51) Int. Cl.
*H04N 5/225* (2006.01)
*H04N 9/093* (2006.01)
*H04N 9/09* (2006.01)

(56) References Cited

U.S. PATENT DOCUMENTS

| | | | |
|---|---|---|---|
| 9,237,321 | B2 | 1/2016 | Kikuchi |
| 2010/0166319 | A1 | 7/2010 | Zhang |
| 2012/0242870 | A1 | 9/2012 | Koizumi |
| 2016/0094822 | A1 | 3/2016 | Imade |

FOREIGN PATENT DOCUMENTS

| | | |
|---|---|---|
| JP | 2010152819 | 7/2010 |
| JP | 2011205587 | 10/2011 |
| JP | 2012199805 | 10/2012 |

OTHER PUBLICATIONS

"Search Report of Europe Counterpart Application," dated Oct. 25, 2019, pp. 1-8.

"International Search Report (Form PCT/ISA/210) of PCT/JP2017/037512," dated Jan. 9, 2018, with English translation thereof, pp. 1-3.

"Written Opinion of the International Searching Authority (Form PCT/ISA/237) of PCT/JP2017/037512," dated Jan. 9, 2018, with English translation thereof, pp. 1-7.

"Office Action of China Counterpart Application", dated Sep. 2, 2020, with English translation thereof, pp. 1-23.

"Office Action of China Counterpart Application" with English translation thereof, dated Mar. 2, 2021, p. 1-p. 20.

FIG. 2
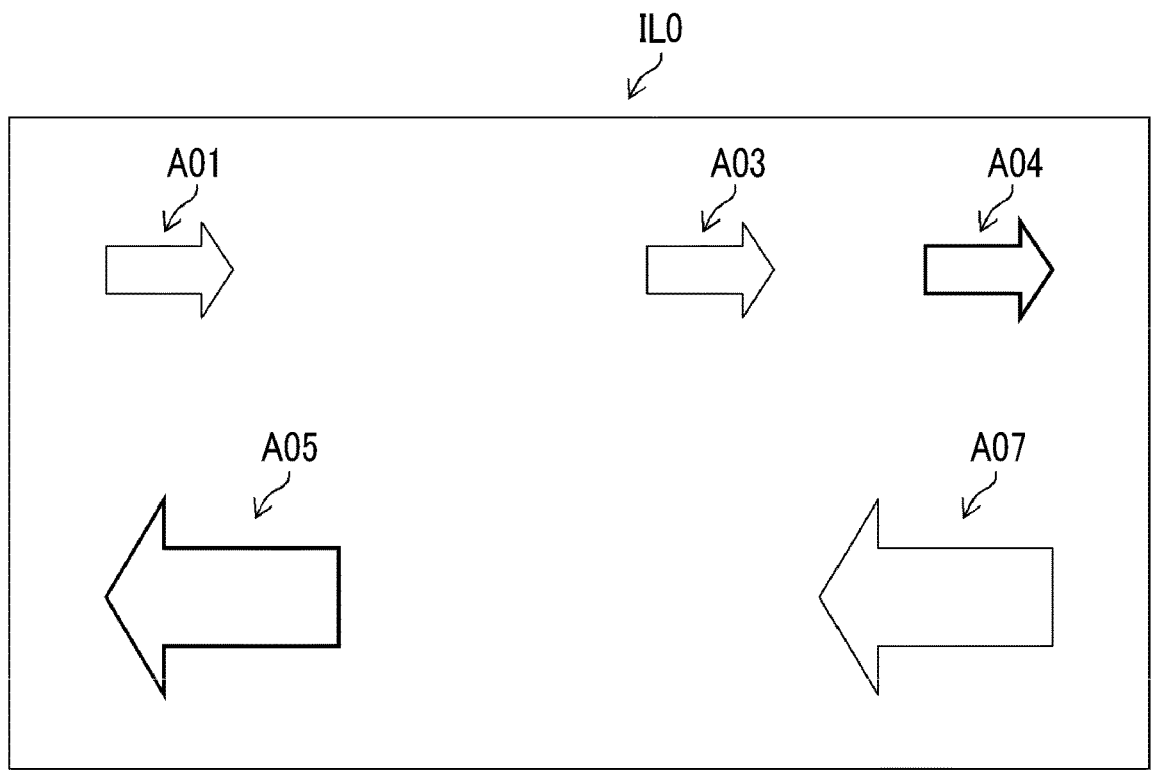
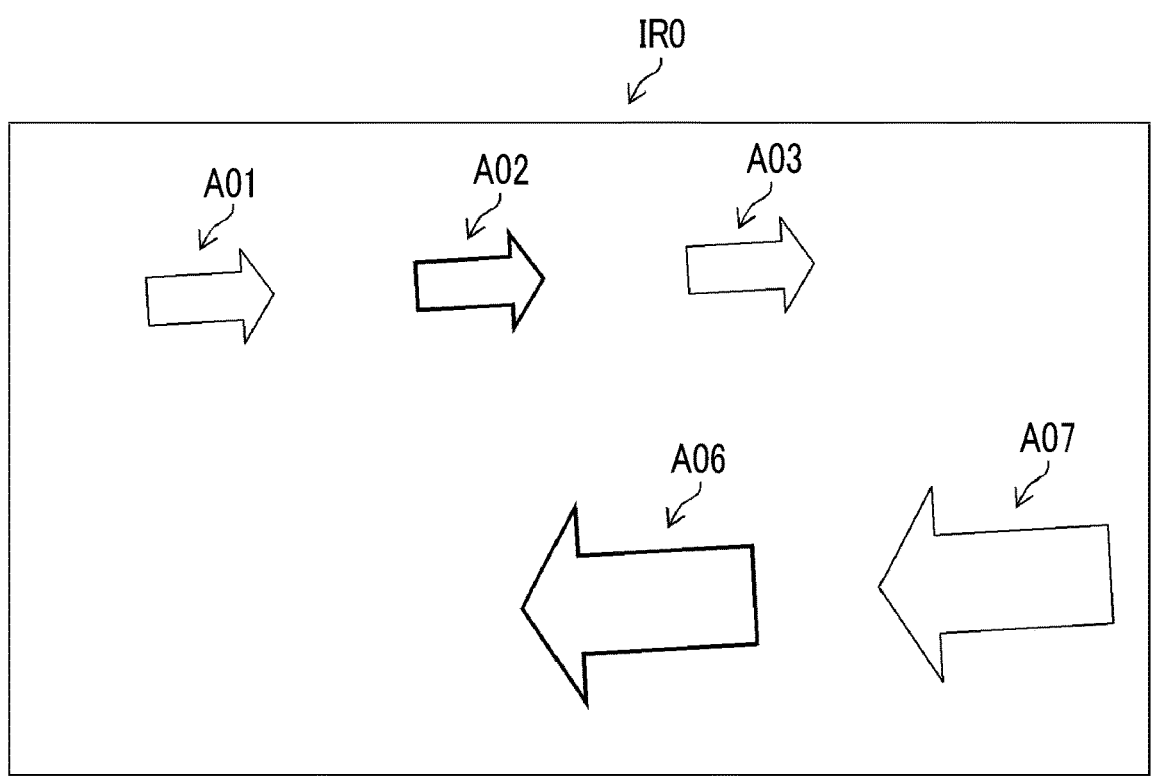

FIG. 3
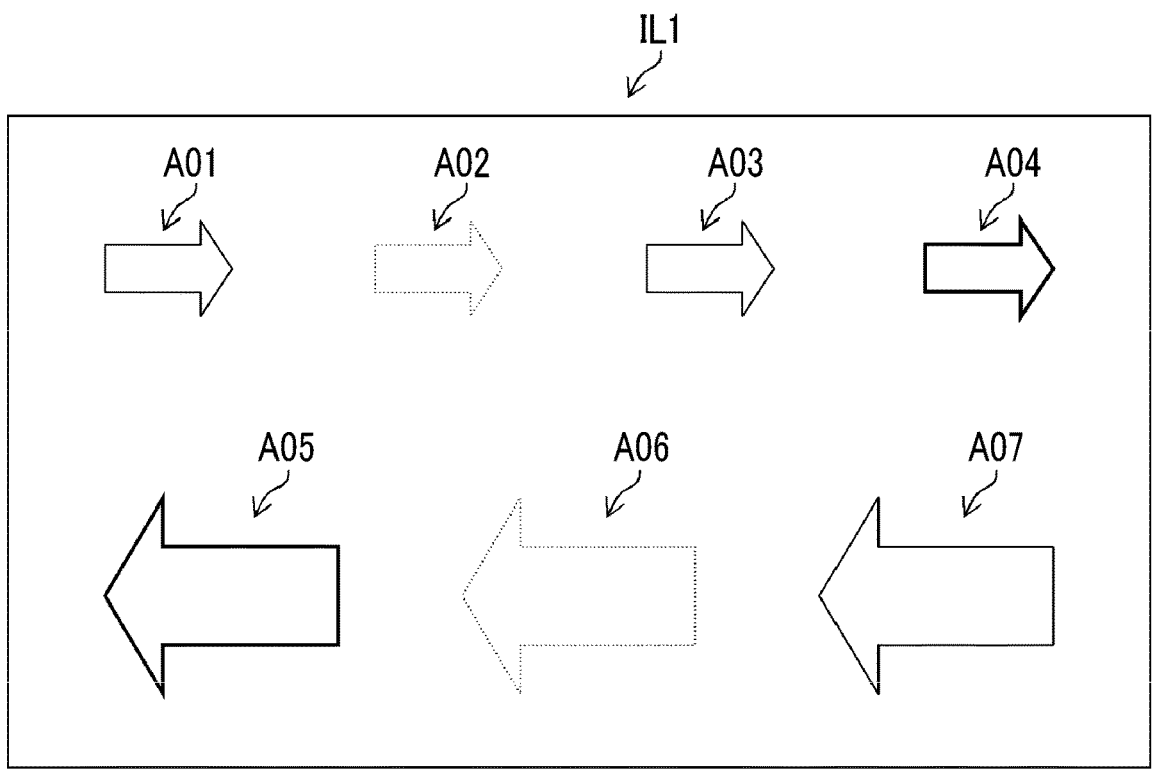
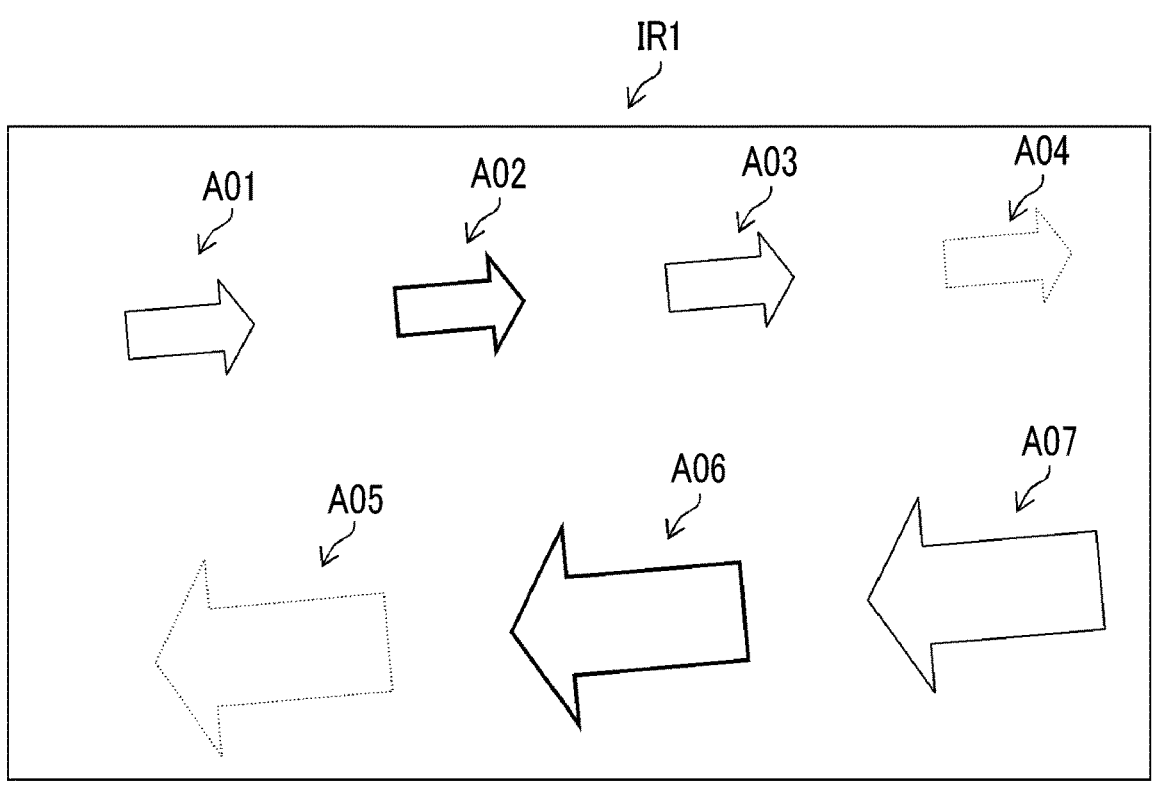

FIG. 5
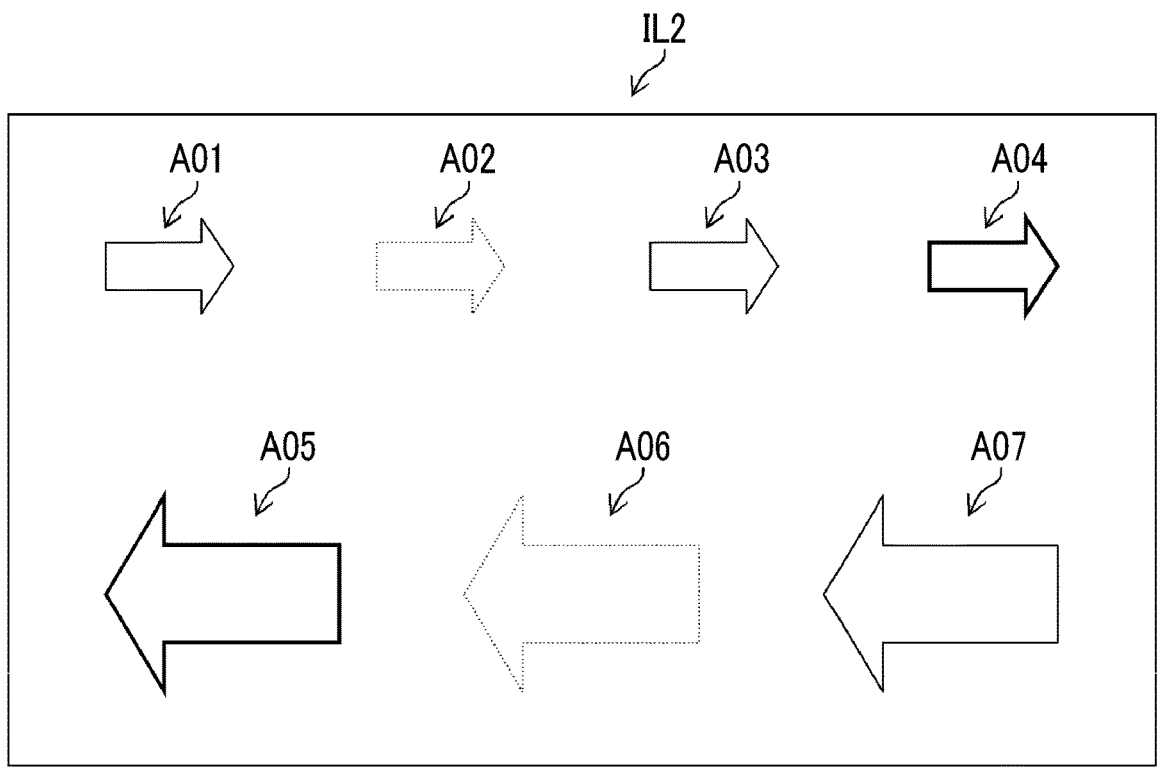
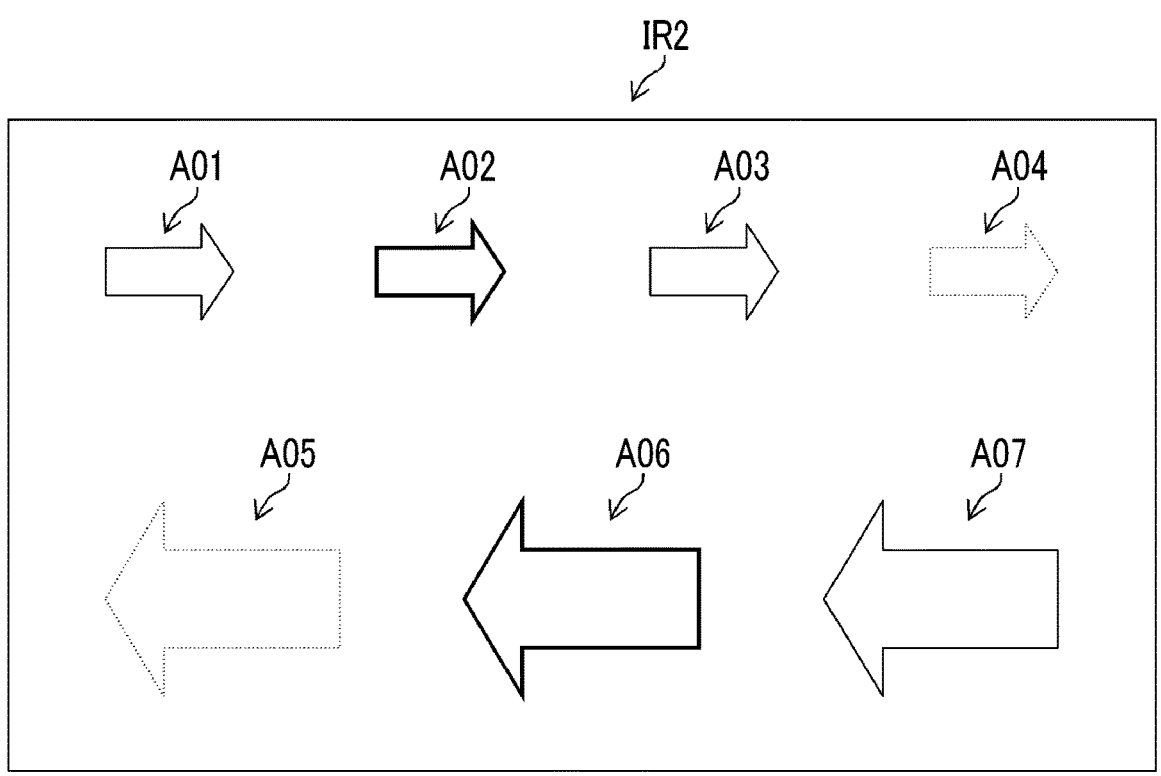

FIG. 6
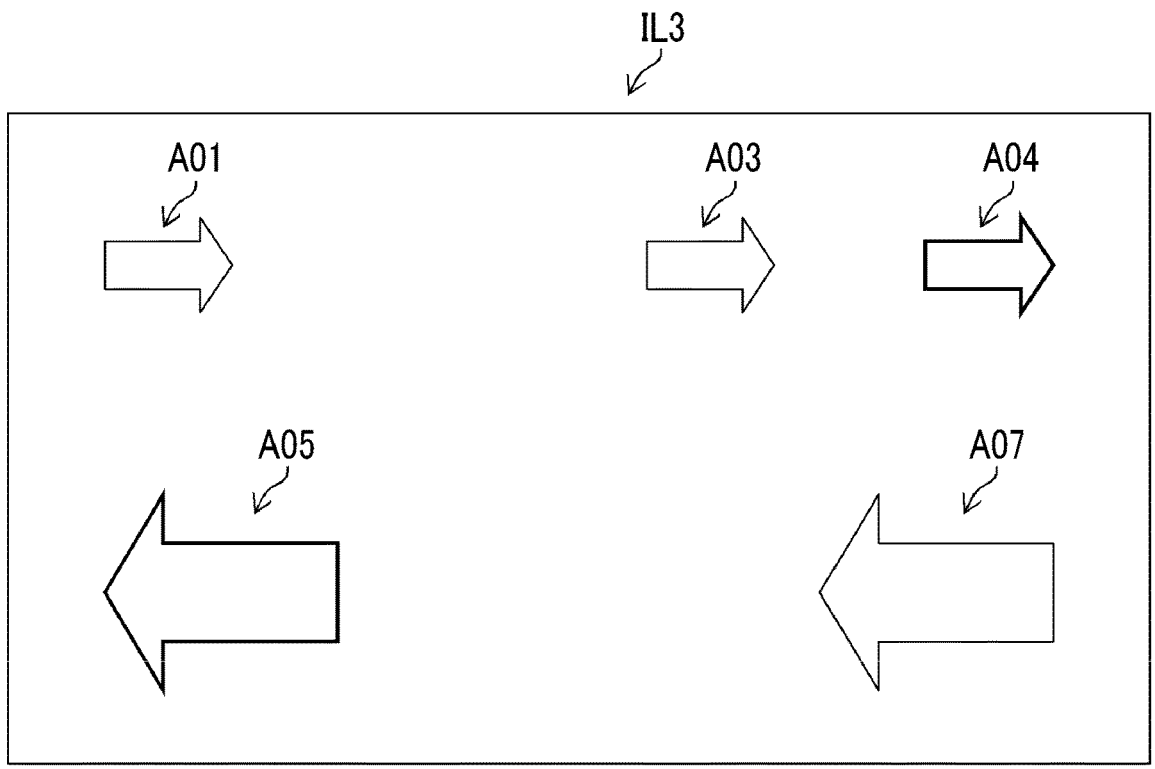
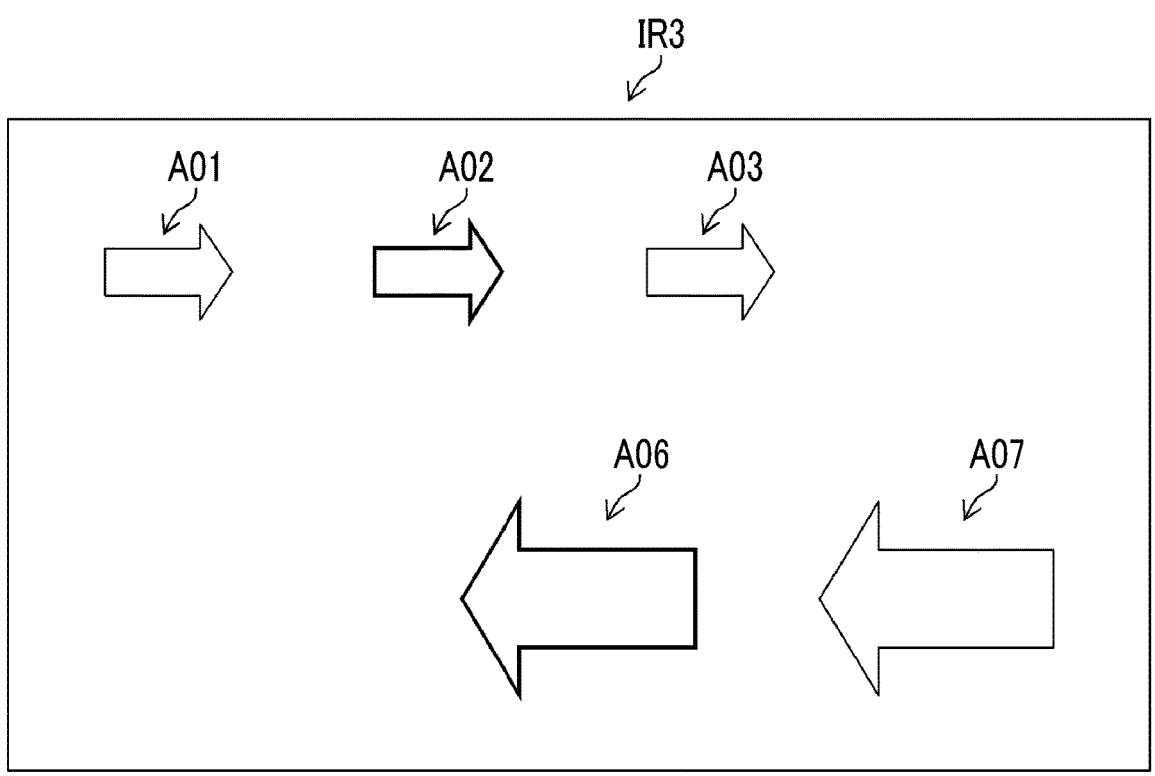

FIG. 14
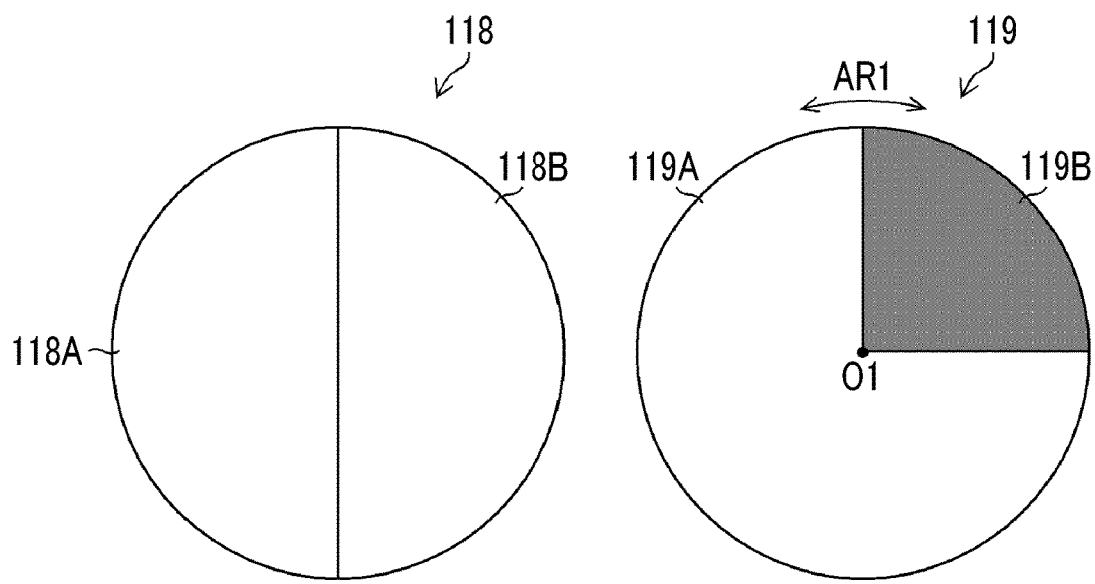
FIG. 15A   FIG. 15B
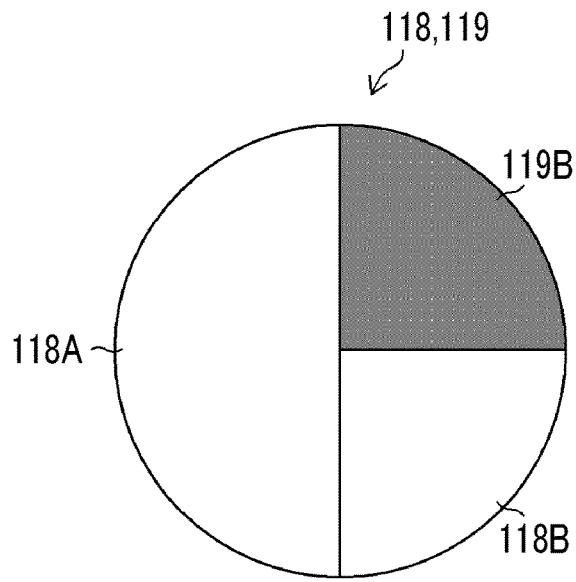 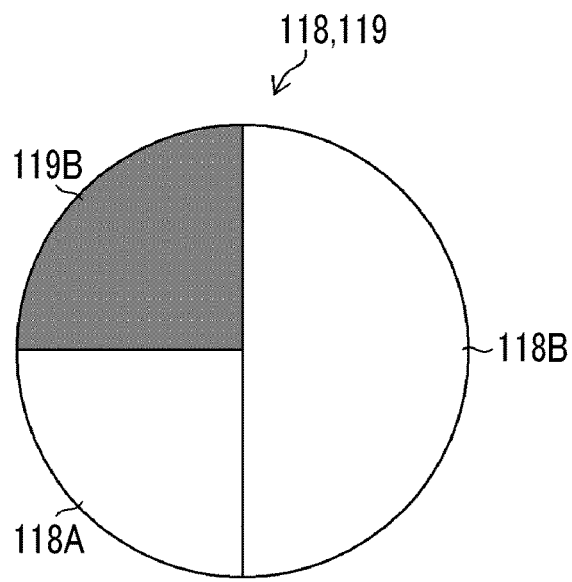

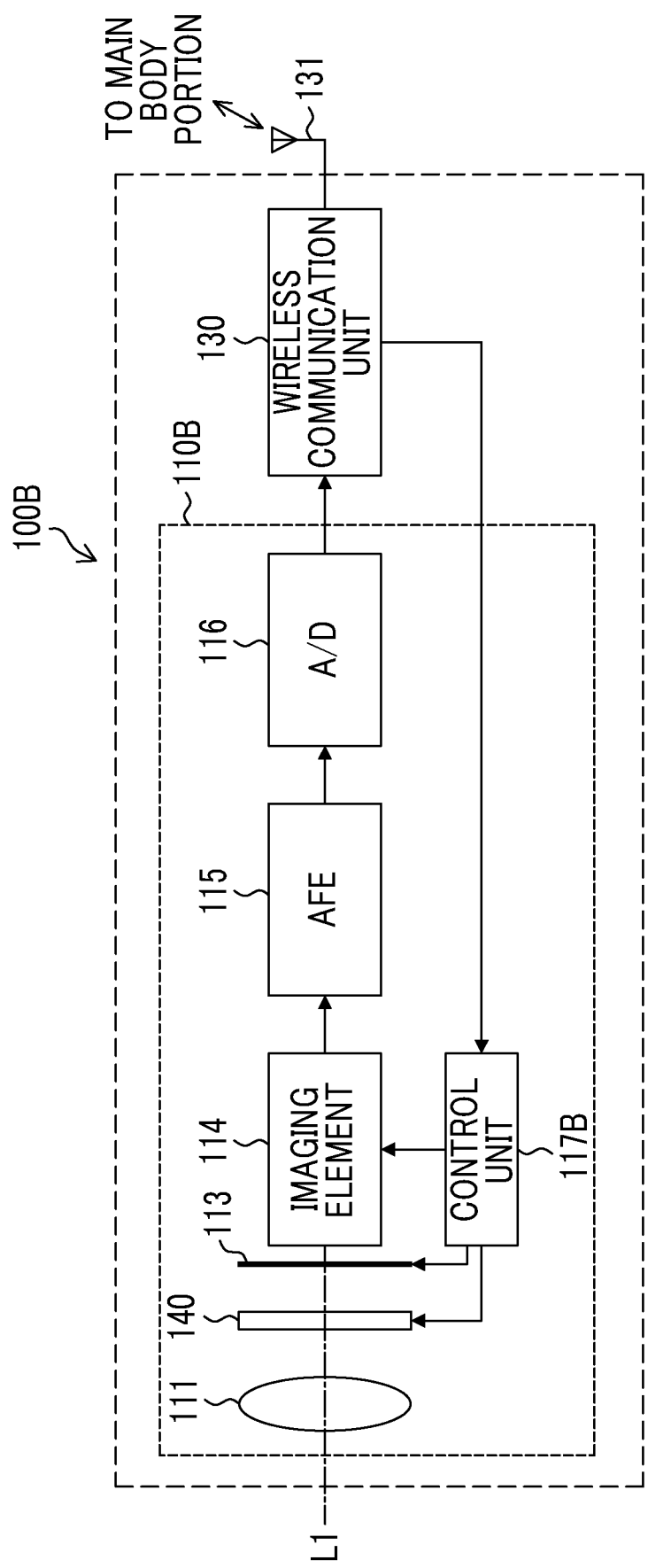

ACQUIRE IMAGE WITH ONE COMPONENT OF WAVELENGTH RANGE BY INCLUDING AN INTENTIONAL INTERFERENCE COMPONENT

CROSS-REFERENCE TO RELATED APPLICATIONS

The present application is a Continuation of PCT International Application No. PCT/JP2017/037512 filed on Oct. 17, 2017 claiming priority under 35 U.S.C. § 119(a) to Japanese Patent Application No. 2016-228101 filed on Nov. 24, 2016. Each of the above applications is hereby expressly incorporated by reference, in their entirety, into the present application.

BACKGROUND OF THE INVENTION

1. Field of the Invention

The present invention relates to an image processing device, an imaging apparatus, and an image processing method, and in particular, to an image processing device that processes images acquired in a plurality of wavelength ranges, an imaging apparatus comprising the image processing device, and an image processing method for the image processing device.

2. Description of the Related Art

In a field of image processing, a technique that uses a plurality of images having different characteristics is known. For example, processing, such as composition of a plurality of images or measurement of a subject with the images, is executed. During such processing, registration of the images is performed. For example, JP2012-199805A describes a technique that acquires a multichannel image using a plurality of imaging units and performs registration of the images through correspondence point detection or the like.

In the technique described in JP2012-199805A, each of a plurality of imaging units has a plurality of imaging element having different characteristics. Specifically, there are "imaging elements having characteristics common among the imaging units" and "imaging elements having unique characteristics in the imaging units". Then, feature points and correspondence points are detected with the images obtained from "the imaging elements having characteristics common among the imaging units" to perform registration (image deformation parameter calculation), and a plurality of images obtained from "the imaging elements having unique characteristics in the imaging units" are composed based on a registration result.

SUMMARY OF THE INVENTION

In JP2012-199805A described above, each imaging unit has a plurality of imaging elements having different characteristics (color characteristics or sensitivity characteristics), and images corresponding to the characteristics of the imaging elements are generated. For this reason, each image includes only information of a single characteristic, and accordingly, there is a case where detection accuracy of correspondence points among the images is bad or correspondence points are not found according to wavelength characteristics of a subject. Furthermore, since a mosaic-shaped color filter (a filter for brightness imaging or a filter for color information imaging of a specific wavelength) is provided in the imaging element, spatial resolution of each image is low, and for this reason, the detection accuracy of the feature points or the correspondence points is also low.

In this way, according to the technique in the related art, it is not possible to register a plurality of images having different characteristics (wavelength range) with high accuracy, and as a result, it is also not possible to perform calculation (image composition, subject measurement, or the like) among the registered images with high accuracy.

The invention has been accomplished in consideration of such a situation, and an object of the invention is to provide an image processing device, an imaging apparatus, and an image processing method capable of acquiring images that are registered with high accuracy and include only a component of a desired wavelength range.

In order to achieve the above-described object, a first aspect of the invention provides an image processing device comprising an image input unit that inputs a plurality of images including at least one of images captured with light having a plurality of wavelength ranges not overlapping one another, at least one wavelength range of the plurality of wavelength ranges being common among the plurality of images, a correspondence point detection unit that detects correspondence points among the plurality of images based on a component of the at least one common wavelength range of a plurality of image signals corresponding to the plurality of images, a registration unit that performs registration of the plurality of images based on the detected correspondence points, and an interference elimination unit that eliminates an influence of light having a wavelength range different from a specific wavelength range on the plurality of images subjected to the registration. The specific wavelength range is any one wavelength range of the plurality of wavelength ranges and is a different wavelength range for each of the plurality of images.

In the image processing device according to the first aspect, at least one image is captured with light having a plurality of wavelength ranges not overlapping one another (that is, including an intentional interference component in addition to a principal wavelength range), and the at least one wavelength range of the plurality of wavelength ranges is common among the images. Accordingly, it is possible to detect correspondence points among a plurality of images based on information (image signal) of such a common wavelength range, and to register the plurality of images with high accuracy. In addition, since an influence of light having a wavelength range other than the specific wavelength range is eliminated after registration, it is possible to acquire a plurality of images including only a component of a desired wavelength range (specific wavelength range).

In this way, in the first aspect, it is possible to acquire images that are registered with high accuracy and include only the component of the desired wavelength range. In the first aspect and each aspect described below, the "desired wavelength range" described above can be the "specific wavelength range".

According to a second aspect, in the image processing device according to the first aspect, the image input unit inputs, as the plurality of images, a plurality of images, all of which are captured with light having the plurality of wavelength ranges. According to the second aspect, since all images are captured with light having the plurality of wavelength ranges, it is possible to select a wavelength range or the specific wavelength range for use in registration from among the plurality of wavelength ranges.

According to a third aspect, the image processing device according to the first or second aspect further comprises a wavelength range designation unit that designates the specific wavelength range from among the plurality of wavelength ranges. According to the third aspect, the desired wavelength range is designated as the specific wavelength range, whereby it is possible to acquire images with the influence (intentional interference component) of light having the wavelength range other than the specific wavelength range eliminated.

According to a fourth aspect, the image processing device according to any one of the first to third aspect further comprises a measurement unit that measures a subject based on the plurality of images with the influence (the intentional interference component described above) eliminated. According to the fourth aspect, it is possible to measure the subject with high accuracy based on a plurality of images of different wavelength ranges that are registered with high accuracy and have the interference component eliminated.

According to a fifth aspect, in the image processing device according to the fourth aspect, the measurement unit measures the subject based on signal intensity of the specific wavelength range in a first region of interest set in one image among the plurality of images with the influence eliminated and signal intensity of the specific wavelength range in a second region of interest set corresponding to the first region of interest in another image excluding the one image among the plurality of images with the influence eliminated. The fifth aspect prescribes an aspect of measurement.

According to a sixth aspect, the image processing device according to the fifth aspect further comprises a region-of-interest setting unit that sets the first region of interest and the second region of interest. According to the sixth aspect, it is possible to set a region of interest on a desired region to measure the subject. The region of interest may be set through a user's operation or may be automatically set through processing in the image processing device without user's operation.

In order to achieve the above-described object, a seventh aspect of the invention provides an imaging apparatus comprising the image processing device according to any one of the first to sixth aspects, an imaging optical system, a plurality of optical filters that are inserted into an optical path of the imaging optical system, and include at least one optical filter transmitting the light having the plurality of wavelength ranges, at least one wavelength range of the plurality of wavelength ranges being common among the filters, and an imaging element on which a plurality of images are formed with light transmitted through the imaging optical system and the plurality of optical filters. The image input unit inputs the images formed on the imaging element as images constituting the plurality of images. According to the seventh aspect, a plurality of images of different wavelength ranges are captured by the imaging optical system in which the optical filters are inserted into the optical path, and images that are registered with high accuracy and include only a component of the desired wavelength range can be acquired from the images.

According to an eighth aspect, in the imaging apparatus according to the seventh aspect, the imaging optical system is a plurality of independent imaging optical systems, any one of the plurality of optical filters is inserted into an optical path of any one of the plurality of imaging optical systems, the imaging element is a plurality of imaging elements corresponding to the plurality of imaging optical systems, and the image input unit inputs, as the plurality of images, a plurality of images formed by incidence of light transmitted through the plurality of imaging optical systems and the plurality of optical filters on the plurality of imaging elements. The eighth aspect shows an aspect of the configuration of the imaging optical system and the imaging element. According to the eighth aspect, a plurality of images of different wavelength ranges are acquired without switching the optical filters, and images that are registered with high accuracy and include only a component of a desired wavelength range can be acquired from the images.

According to a ninth aspect, the imaging apparatus according to the eighth aspect further comprises an imaging control unit that controls imaging timing of the plurality of images by the plurality of imaging elements to make the plurality of imaging elements capture the plurality of images simultaneously, and the image input unit inputs the plurality of images captured simultaneously. According to the ninth aspect, it is possible to capture a plurality of images without misregistration due to deviation of imaging timing, and thus, it is possible to perform registration of images with high accuracy. The ninth aspect is effective for, for example, a case where the subject moves or deforms. In the ninth aspect, "simultaneous" imaging is not limited to a case where the imaging timing is completely simultaneous and also includes a case where the imaging timing is deviated within an allowable range for the purpose of registration or measurement.

According to a tenth aspect, in the imaging apparatus according to the seventh aspect, the imaging optical system is a single imaging optical system, the imaging element is a single imaging element corresponding to the single imaging optical system, the imaging apparatus further comprises a filter switching unit that inserts any one of the plurality of optical filters into an optical path of the single imaging optical system, and the image input unit inputs images formed by incidence of light transmitted through the single imaging optical system and any one of the plurality of optical filters on the single imaging element as images constituting the plurality of images. The tenth aspect shows another aspect of the configuration of the imaging optical system and the imaging element, it is possible to acquire images of different wavelength ranges can be acquired by switching the optical filters, and since the imaging optical system and the imaging element are single, registration of images can be easily performed with high accuracy.

According to an eleventh aspect, in the imaging apparatus according to any one of the seventh to tenth aspects, the at least one optical filter is an optical filter that is constituted by combining a plurality of single wavelength range optical filters transmitting light having a single wavelength range and transmitting light having different wavelength ranges. As in the eleventh aspect, a plurality of optical filters that transmit light having a single wavelength range are combined, whereby it is possible to more easily constitute an optical filter transmitting light having a desired wavelength range than in a case where light having a plurality of wavelength range is made to be transmitted through a single optical filter.

According to a twelfth aspect, in the imaging apparatus according to any one of the seventh to eleventh aspects, the plurality of optical filters are different in transmittance depending on a wavelength range. In the twelfth aspect, the ratio of transmittance can be set according to the purpose of use of the images, such as measurement. For example, it is possible to set the transmittance of a principal wavelength range to be higher than transmittance of an interfering wavelength range while setting, to all wavelength ranges, transmittance to such a degree that the correspondence points can be detected.

According to a thirteenth aspect, in the imaging apparatus according to any one of the seventh to twelfth aspects, the plurality of optical filters are inserted at a position of a pupil of the imaging optical system.

According to a fourteenth aspect, the imaging apparatus according to any one of the seventh to thirteenth aspects further comprises an optical member that adjusts an aperture degree of the imaging optical system with respect to the plurality of optical filters. According to the fourteenth aspect, the aperture degree with respect to the optical filters is adjusted, whereby it is possible to adjust a component ratio of a wavelength range in images to be acquired.

According to a fifteenth aspect, in the imaging apparatus according to any one of the seventh to fourteenth aspects, the imaging element is a monochrome imaging element. According to the fifteenth aspect, since a mosaic-shaped color filter is not needed, it is possible to acquire images having high spatial resolution, and to perform registration or measurement with high accuracy.

In order to achieve the above-described object, a sixteenth aspect of the invention provides an image processing method comprising an image input step of inputting a plurality of images including at least one of images captured with light having a plurality of wavelength ranges not overlapping one another, at least one wavelength range of the plurality of wavelength ranges being common among the plurality of images, a correspondence point detection step of detecting correspondence points among the plurality of images based on a component of the at least one common wavelength range of a plurality of image signals corresponding to the plurality of images, a registration step of performing registration of the plurality of images based on the detected correspondence points, and an interference elimination step of eliminating an influence of light having a wavelength range different from a specific wavelength range on the plurality of images subjected to the registration. The specific wavelength range is any one wavelength range of the plurality of wavelength ranges and is a different wavelength range for each of the plurality of images. According to the sixteenth aspect, as in the first aspect, it is possible to acquire images that are registered with high accuracy and include only a component of a desired wavelength range. In the sixteenth aspect, the same configurations as in the second to fifteenth aspects may be included. A program that causes the image processing device to execute the method according to the aspects and a non-transitory computer-readable recording medium storing such a program can also be exemplified as aspects of the invention.

As described above, with the image processing device, the imaging apparatus, and the image processing method of the invention, it is possible to acquire images that are registered with high accuracy and include only a component of a desired wavelength range.

BRIEF DESCRIPTION OF THE DRAWINGS

FIG. 2 is a conceptual diagram showing an image captured using a method in the related art.

FIG. 3 is a conceptual diagram illustrating registration of images according to the invention.

FIG. 5 is a further conceptual diagram illustrating registration of images according to the invention.

FIG. 6 is still another conceptual diagram illustrating registration of images according to the invention.

FIG. 14 is a diagram showing an example of an optical filter in the second embodiment.

FIGS. 15A and 15B are other diagrams showing an example of the optical filter in the second embodiment.

FIG. 16 is a block diagram showing the configuration of an imaging unit in a third embodiment.

DESCRIPTION OF THE PREFERRED EMBODIMENTS

Hereinafter, an embodiment of an image processing device, an imaging apparatus, and an image processing method according to the invention will be described in detail referring to the accompanying drawings.

<Image Registration and Interference Elimination>

First, a method in the related art and an image registration and interference elimination method according to the invention will be described in principle.

Figure 1:
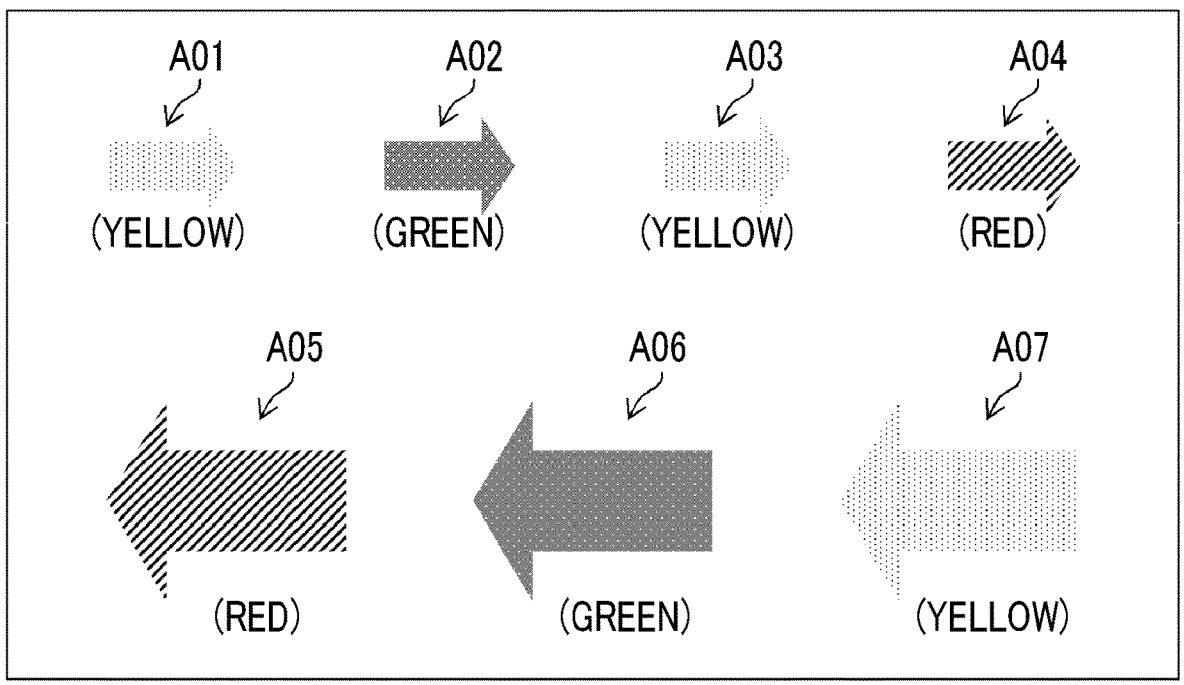
FIG. 1 is a diagram showing an example of a subject.

It is assumed that subjects A01 to A07 of FIG. 1 are imaged with a binocular imaging apparatus in which an optical filter transmitting only red light is inserted into a first optical system (including an imaging lens and an imaging element) and an optical filter (having a transmitting wavelength range not overlapping the wavelength range of the optical filter of the first optical system) transmitting only green light is inserted into the second optical system (including an imaging lens and an imaging element). Although the subjects A01, A03, and A07 are yellow, the subject A02 and the subject A06 are green, and the subject A04 and the subject A05 are red, since the difference in color is hard to be shown, the difference in color is represented by oblique lines and dot density in FIG. 1.

In a multiocular imaging apparatus, such as the above-described imaging apparatus, there is a case where individual optical systems vary in characteristics or installation positions are slightly deviated even though optical systems having the same specification are used, and for this reason, as shown in FIG. 2, misregistration or rotational deviation occurs like an image IL0 of the first optical system and an image IR0 of the second optical system. In such a state, since the position or angle of the subject is deviated, a correct result is not obtained even though inter-image calculation (for example, image composition or subject measurement) is performed.

Then, even though the images including misregistration or rotational deviation shown in FIG. 2 are registered, since the transmitting wavelength ranges do not overlap between the first optical system and the second optical system in the above-described binocular imaging apparatus, there is a case where an image present in the image IL0 is not present in the image IR0 or a case where an image present in the image IR0 is not present in the image IL0 conversely. For example, in the example of FIG. 2, in the image IL0, the red subjects A04 and A05 are clearly shown, and the yellow subjects A01, A03, and A07 are shown unclearly (since yellow light includes a component of red light and a component of green light); however, the green subjects A02 and A06 are not shown. In the image IR0, the green subjects A02 and A06 are shown clearly, the yellow subjects A01, A03, and A07 are shown unclearly; however, the red subjects A04 and A05 are not shown. In FIG. 2, clearness of an image is represented by the thickness of an outline (edge).

Accordingly, since the subjects A02, A04, A05, and A06 are not present in both images, correspondence points cannot be detected for these subjects.

In this way, according to the method in the related art, in a case where a plurality of images are captured in non-overlapping wavelength ranges, there is a case where registration accuracy is degraded or a case where registration cannot be performed depending on frequency characteristics of subjects, and as a result, there is a case where inter-image calculation cannot be performed with high accuracy.

Accordingly, in the invention, an image (image signal) in which a component of a wavelength range (sub-wavelength range) for registration is intentionally interfered in addition to a component of a wavelength range (principal wavelength range) for acquiring an image is acquired. For example, an optical filter configured such that a ratio of a component of red light (principal wavelength range) to a component of green light (sub-wavelength range) becomes 1.0:0.5 is used in the first optical system, and conversely, an optical filter configured such that a ratio of red light (principal wavelength range) to a component of green light (sub-wavelength range) becomes 0.5:1.0 is used in the second optical system (these values are examples and can be set according to the characteristics of the subjects or measurement contents).

In a case where the subjects A01 to A07 of FIG. 1 are imaged with the optical systems having such configurations, images, such as an image IL1 of the first optical system and an image IR1 of the second optical system shown in FIG. 3, are obtained. Referring to FIG. 3, in the image ILL the red subjects A04 and A05 are shown clearly, and the green subjects A02 and A06 are also shown but unclearly compared to the red subjects. In the image IR1, the green subjects A02 and A06 are shown clearly, and the red subjects A04 and A05 are also shown but unclearly compared to the green subjects. In both images, the yellow subjects A01, A03, and A07 are shown.

Figure 4:
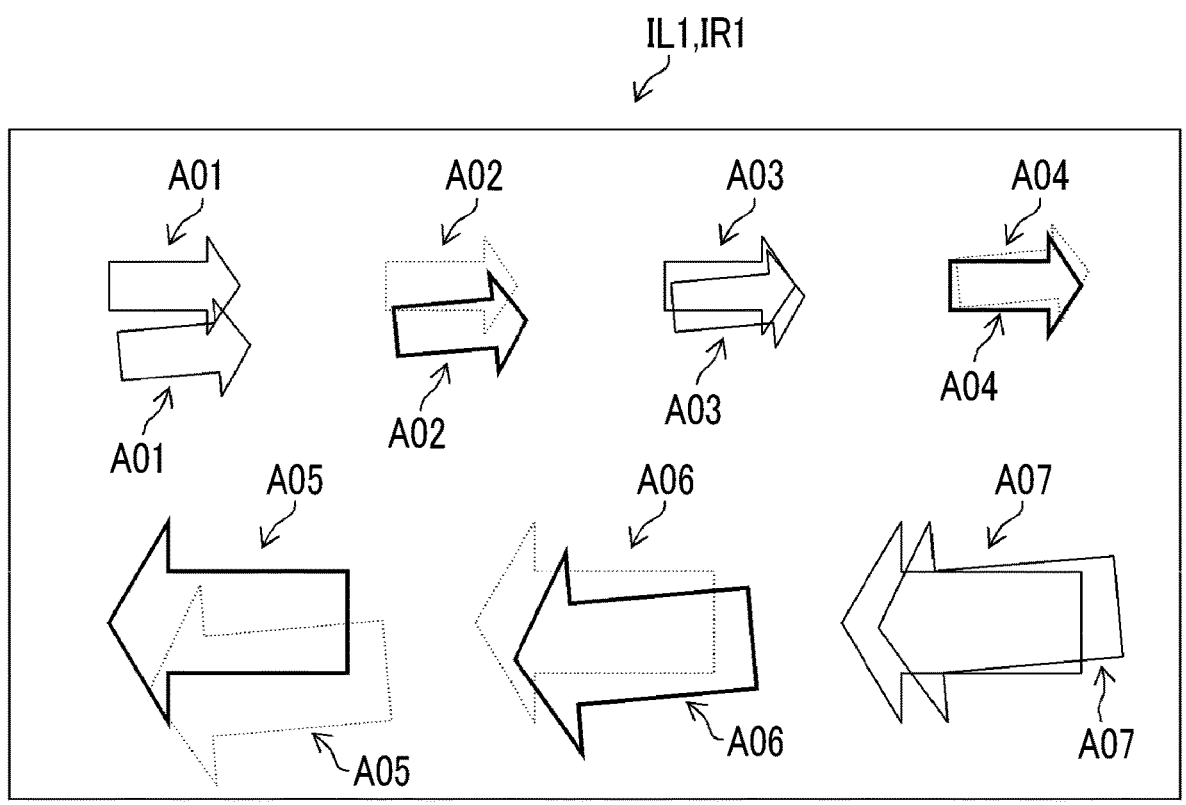
FIG. 4 is another conceptual diagram illustrating registration of images according to the invention.

Accordingly, in both images, all of the subjects A01 to A07 are shown, and correspondence points can be detected on all subjects. Accordingly, it is possible to correct misregistration and rotational deviation between the image IL1 and the image IR1 shown in FIG. 4 based on a detection result of the correspondence points with high accuracy (FIG. 4 shows a mode in which the image IL1 and the image IR1 are superimposed to cause misregistration and rotational deviation, and registration is performed such that the two images coincide with each other). As a method of correspondence point detection and registration, various known methods (for example, a point of an edge or a corner portion is detected as a feature point of a reference image, a correspondence point is detected in another image through matching between images, and the images are moved, rotated, enlarged, and/or reduced such that the positions of the feature point and the correspondence point coincide with each other) can be used. Then, an image IL2 of the first optical system and an image IR2 of the second optical system shown in FIG. 5 are obtained through registration. The image IL2 and the image IR2 are images that are subjected to registration, and include an interference component (a component of a sub-wavelength range).

When the images after registration shown in FIG. 5 are obtained, an interference component (a component of a sub-wavelength range) is eliminated from the images. Specifically, a component of green light is eliminated from the image IL2, and a component of red light is eliminated from the image IR2. As described above, in the invention, a component of a sub-wavelength range is intentionally interfered, and a ratio of the component of the sub-wavelength range to a principal wavelength range can be ascertained in advance, and the interference component is easily eliminated. As a method of interference component elimination, various known methods that are the same as in correspondence point detection and registration can be used.

For example, in the imaging apparatus using the optical filters having the above-described transmission ratios, when true pixel values (in a state where there is no interference) of red light and green light in a certain pixel are $R_{ij}$ and $G_{ij}$, and actual pixel values (in a state where there is interference) are $RG_{ij}$ and $GR_{ij}$, the relationship between $(R_{ij},G_{ij})$ and $(RG_{ij},GR_{ij})$ is represented by Expression (1) described below.

$$\begin{pmatrix} RGij \\ GRij \end{pmatrix} = \begin{pmatrix} 1.0 & 0.5 \\ 0.5 & 1.0 \end{pmatrix} \times \begin{pmatrix} Rij \\ Gij \end{pmatrix} \qquad (1)$$

Accordingly, an inverse matrix of a coefficient matrix is multiplied to the actual pixel values like Expression (2) described below, whereby it is possible to obtain the true pixel values from the actual pixel values.

$$\begin{pmatrix} Rij \\ Gij \end{pmatrix} = \begin{pmatrix} 1.0 & 0.5 \\ 0.5 & 1.0 \end{pmatrix}^{-1} \times \begin{pmatrix} RGij \\ GRij \end{pmatrix} \qquad (2)$$

FIG. 6 is a diagram showing images after interference component elimination. In an image IL3 of the first optical system, since a component of green light is eliminated, the images of the subjects A02 and A06 are eliminated. In an image IR3 of the second optical system, since a component of red light is eliminated, the images of the subjects A04 and A05 are eliminated.

In this way, in the invention, since images that are registered with high accuracy and include only a component of a desired wavelength range (the above-described principal wavelength range) are obtained, it is possible to perform inter-image calculation with high accuracy using these images.

First Embodiment

<Configuration of Image Processing System>

Figure 7:
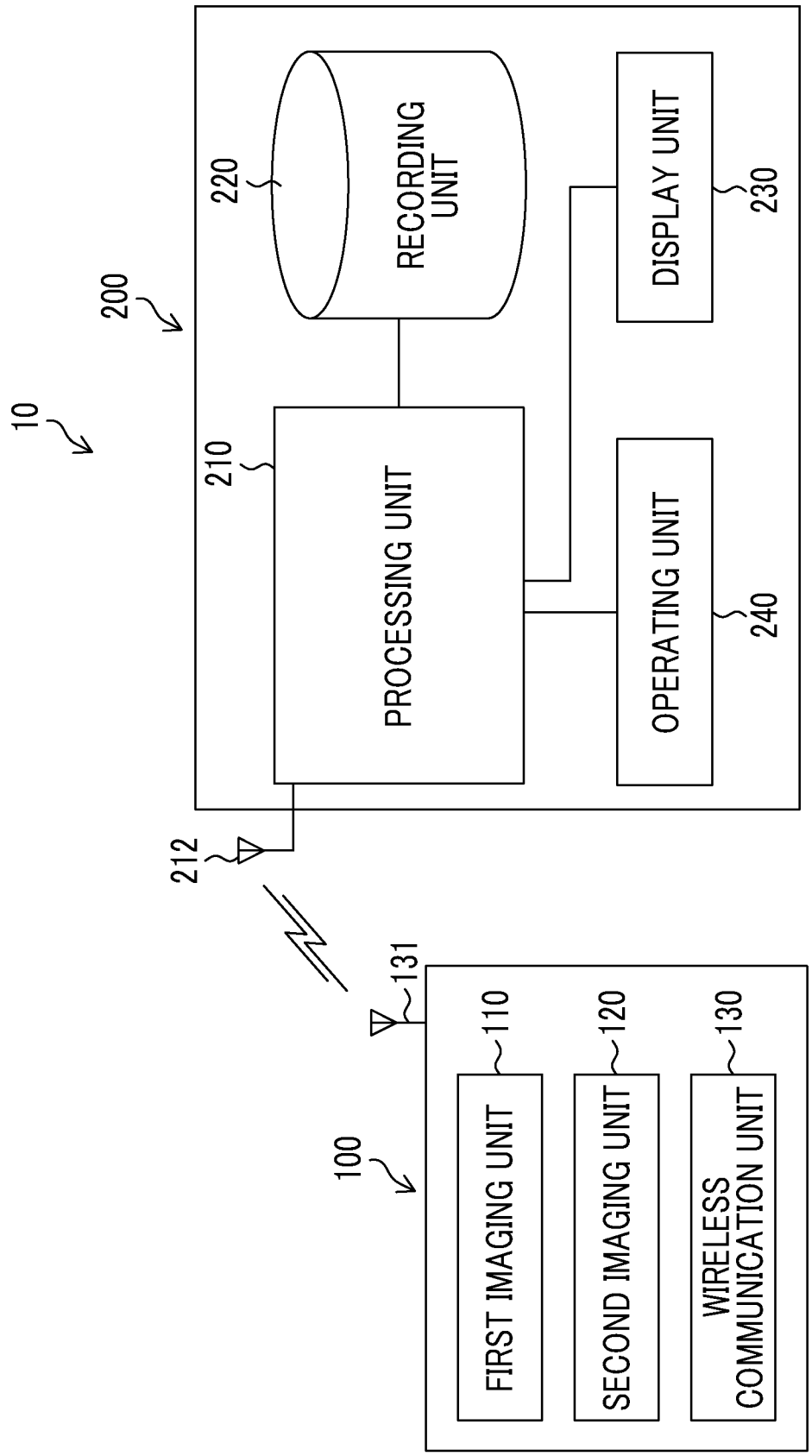
FIG. 7 is a block diagram showing the configuration of an image processing system according to a first embodiment of the invention.

Hereinafter, a specific embodiment of the invention will be described. FIG. 7 is a block diagram showing the schematic configuration of an image processing system 10 (image processing device or imaging apparatus) according to a first embodiment. The image processing system 10 includes an imaging unit 100 (image input unit) and a main body portion 200 (image processing device), and transmits and receives image data or the like through wireless communication. The imaging unit 100 comprises a first imaging unit 110, a second imaging unit 120, and a wireless communication unit 130, acquires images in response to an instruction from the main body portion 200, and transmits the images to the main body portion 200. The main body portion 200 comprises a processing unit 210 (image input unit, correspondence point detection unit, registration unit, interference elimination unit, wavelength range designation unit, measurement unit, region-of-interest setting unit, and imaging control unit), a recording unit 220, a display unit 230, and an operating unit 240, and these units are connected to one another to transmit and receive needed information. The processing unit 210 includes an antenna for wireless communication and an input/output interface circuit, and the recording unit 220 includes a non-transitory recording medium, such as a hard disk drive (HDD). The display unit 230 includes a display device, such as a liquid crystal display, and the operating unit 240 includes an input device, such as a keyboard or a mouse. In the first embodiment, although a case where the images are captured by the imaging unit 100 and input to the main body portion 200 will be described, images acquired by means other than the imaging unit 100 may be input by way of a recording medium or a network.

<Configuration of Processing Unit>

Figure 8:
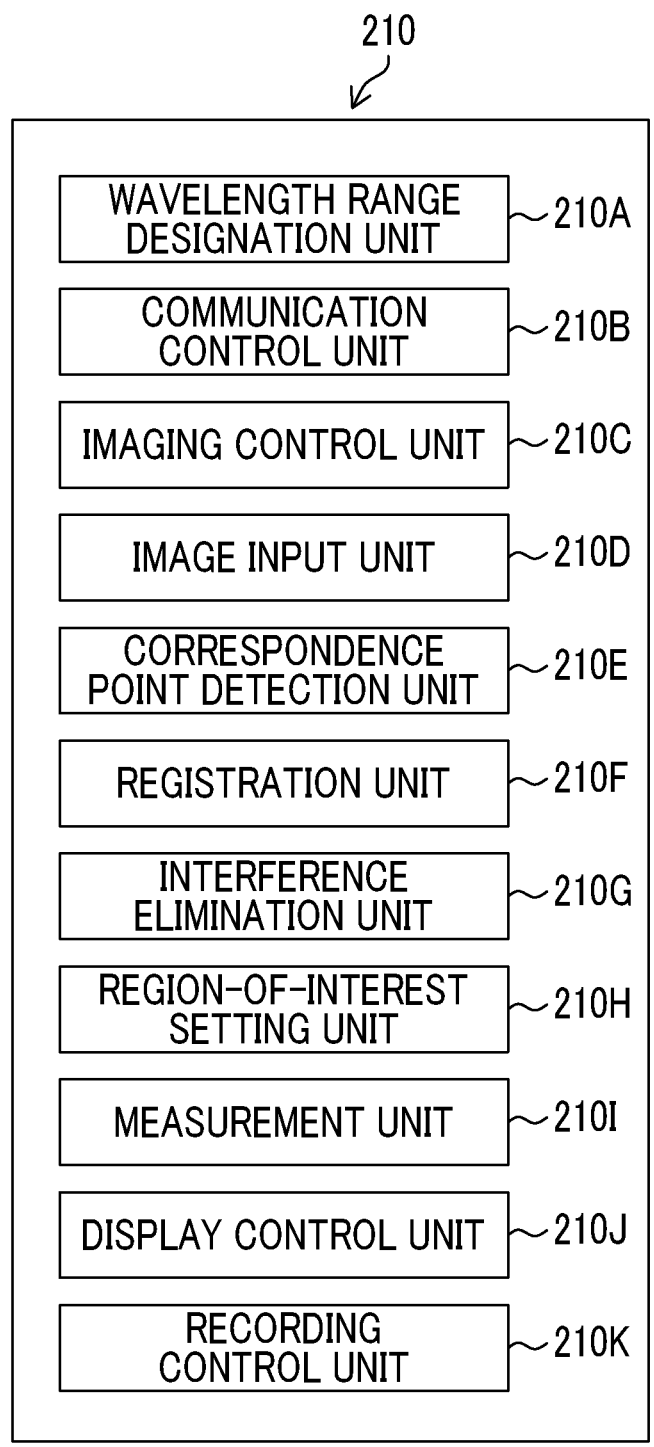
FIG. 8 is a diagram showing the functional configuration of a processing unit in the first embodiment.

FIG. 8 is a diagram showing the functional configuration of the processing unit 210. The processing unit 210 comprises a wavelength range designation unit 210A (wavelength range designation unit), a communication control unit 210B, an imaging control unit 210C (imaging control unit), an image input unit 210D (image input unit), a correspondence point detection unit 210E (correspondence point detection unit), a registration unit 210F (registration unit), an interference elimination unit 210G (interference elimination unit), a region-of-interest setting unit 210H (region-of-interest setting unit), a measurement unit 210I (measurement unit), a display control unit 210J, and a recording control unit 210K. These functions are performed by a central processing unit (CPU) or a device, such as various electronic circuits, executing a program stored in a ROM or the like while appropriately referring to images or information stored in the recording unit 220 or data stored in an electronically erasable and programmable read only memory (EEPROM: non-transitory recording medium) or the like. In this case, a computer-readable code of a program causing the image processing system to execute an image processing method according to the invention is recorded in the ROM or the like. At the time of processing, a random access memory (RAM) or the like is used as a temporary storage region or a work region. In FIG. 8, these devices are omitted.

The wavelength range designation unit 210A designates a specific wavelength range on a plurality of acquired images. The communication control unit 210B performs communication with the imaging unit 100 through the antenna 212 for wireless communication. The imaging control unit 210C controls imaging of the imaging unit 100 through the communication control unit 210B. The image input unit 210D inputs a plurality of images acquired by the imaging unit 100 and reads the images stored in the recording unit 220. The correspondence point detection unit 210E detects correspondence points among a plurality of input images, and the registration unit 210F performs registration of a plurality of images based on the detected correspondence points. The interference elimination unit 210G eliminates an influence (intentional interference component) of light having a wavelength range different from a specific wavelength range (desired wavelength range) on the registered images, the region-of-interest setting unit 210H sets a region of interest for performing measurement to the images after interference elimination, and the measurement unit 210I performs measurement on the set region of interest. The display control unit 210J performs display control of the images or a measurement result on the display unit 230. The recording control unit 210K performs control for writing and/or reading the images or the measurement result to and from the recording unit 220. The above-described units appropriately perform processing in response to a user's operation through the operating unit 240. A procedure of the image processing of these units will be described below.

<Configuration of Recording Unit>

The recording unit 220 includes a non-transitory recording medium, such as a compact disk (CD), a digital versatile disk (DVD), a hard disk, or various semiconductor memories, and a control circuit thereof, and records the images and various kinds of information in association with each other. The images include captured images of the first imaging unit 110 and the second imaging unit 120, images after registration, images after interference elimination, and images indicating the measurement result, and various kinds of information include imaging conditions, image processing conditions, measurement conditions, and measurement results.

<Configurations of Display Unit and Operating Unit>

The display unit 230 comprises a display device (not shown), such as a liquid crystal display, and can display the images input from the imaging unit 100, the images and various kinds of information stored in the recording unit 220, and the images or the measurement results obtained by the processing unit 210. The operating unit 240 includes an input device (not shown), such as a pointing device including a mouse or a keyboard, and the user can perform an operation of the images, buttons, or the like displayed on the display unit 230 through the operating unit 240, an operation of setting of imaging conditions, a wavelength range, and a region of interest, or the like.

<Configuration of Imaging Unit>

Figure 9:
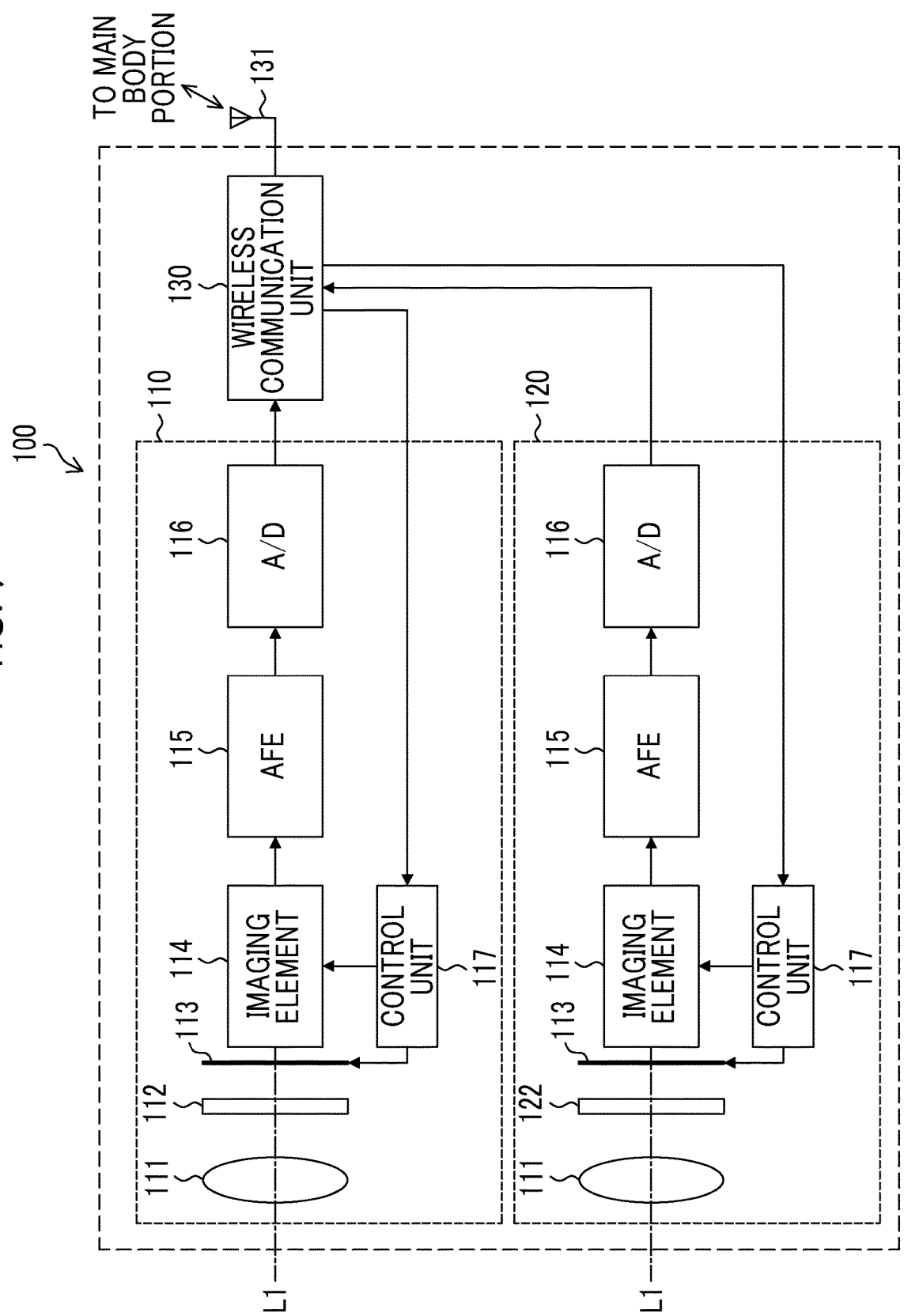
FIG. 9 is a diagram showing the configuration of an imaging unit in the first embodiment.

FIG. 9 is a block diagram showing the configuration of the imaging unit 100. The imaging unit 100 comprises a first imaging unit 110, a second imaging unit 120, and a wireless communication unit 130. The first imaging unit 110 and the second imaging unit 120 are independent imaging units that capture images in wavelength ranges described below, and the wireless communication unit 130 performs communication with the main body portion 200 through the antenna 131 for wireless communication. In the first embodiment, although a case where the imaging unit 100 comprises two imaging units has been described, the number of imaging units in the invention may be equal to or greater than three. In the first embodiment, although a case where the imaging unit 100 can move independently of the main body portion 200 has been described, the imaging unit and the main body portion may be integrated or the imaging unit and the main body portion may be connected in a wired manner.

<First Imaging Unit>

The first imaging unit 110 includes an imaging lens 111 (imaging optical system), an optical filter 112 (optical filter), a shutter 113, an imaging element 114 (imaging element, monochrome imaging element), an analog front end (AFE) 115, an analog to digital (A/D) converter 116, and a control unit 117 (imaging control unit).

The imaging lens 111 is a lens that is provided to be movable along an optical axis L1 at the time of zoom control or focus adjustment. In FIG. 9, although only one imaging lens 111 is shown, the imaging lens 111 is constituted of a plurality of lenses, and includes a zoom lens that is driven at the time of the zoom control, a focus lens that is driven at the time of the focus adjustment, and the like. The optical filter 112 is inserted at a position of a pupil in an optical path of the imaging lens 111. The configuration of the optical filter 112 will be described below.

The imaging element 114 is, for example, a charge coupled device (CCD) type imaging element or a complementary metal-oxide semiconductor (CMOS) type imaging element, and is a monochrome imaging element (a mosaic-shaped color filter is not provided on an imaging surface) on which light transmitted through the imaging lens 111 and the optical filter 112 (see FIG. 10) is incident and an optical image of a subject is formed. An imaging signal that is output from the imaging element 114 is input to the AFE 115, is subjected to noise elimination through correlative double sampling, and is amplified. The imaging signal subjected to noise elimination and amplified by the AFE 115 is converted to digital image data by the A/D converter 116. In a case where the imaging element 114 is a CMOS type imaging element, the A/D converter 116 is often embedded in the imaging element 114.

The control unit 117 controls imaging timing (an opening/closing timing of the shutter 113, or the like) based on a command from the main body portion 200 through the wireless communication unit 130, and make the first imaging unit 110 and the second imaging unit 120 perform imaging simultaneously. In this case, it is assumed that the term "simultaneously" is a concept including not only a case where the imaging is completely simultaneously performed but also a case where the imaging timing is deviated within an allowable range for the purpose of registration or measurement. The control unit 117 transmits digital image data output from the first imaging unit 110 and the second imaging unit 120 to the main body portion 200 through the wireless communication unit 130 and the antenna 131.

<Second Imaging Unit>

The configuration of the second imaging unit 120 is the same as the configuration of the first imaging unit 110 excluding an optical filter 122 (optical filter), and on the second imaging unit 120, light transmitted through the imaging lens 111 and the optical filter 122 (see FIG. 10) is incident on the imaging element 114 and an optical image of a subject is formed. In FIG. 9, the same components as those of the first imaging unit 110 are represented by the same reference numerals, and detailed description thereof will not be repeated. The first imaging unit 110 and the second imaging unit 120 have the common optical axis L1, and cope with an influence on the images due to a characteristic error of the optical system or installation deviation through registration described below.

<Optical Filter>

Figure 10:
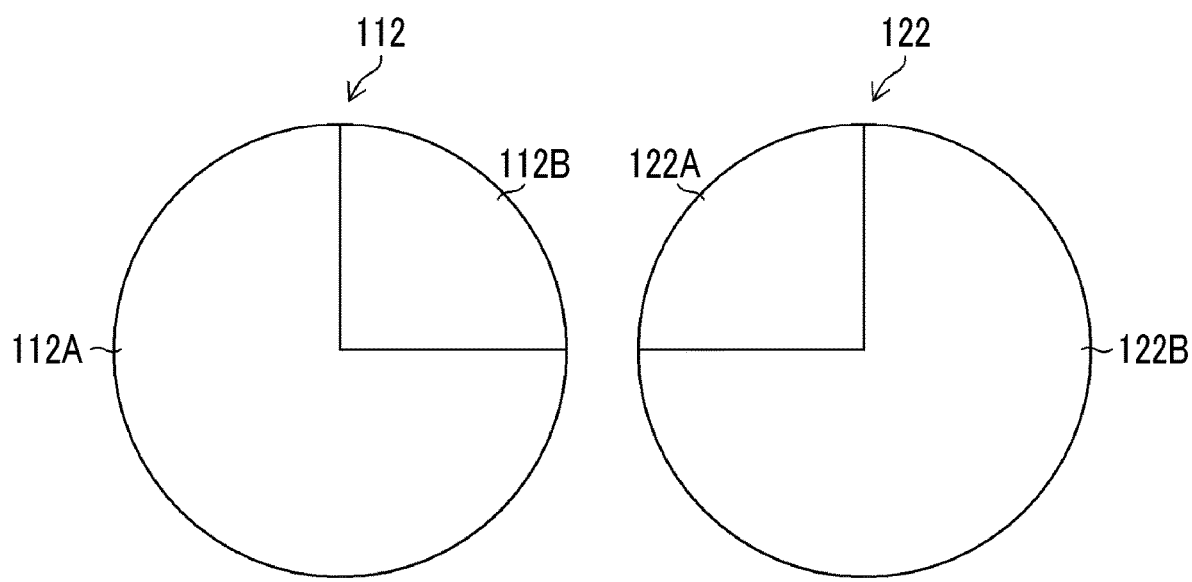
FIG. 10 is a diagram showing an example of an optical filter in the first embodiment.

The optical filter 112 of the first imaging unit 110 is an optical filter that transmits light having a plurality of wavelength ranges, and transmits different wavelength ranges depending on regions. Specifically, as shown in FIG. 10, ¾ of the entire region is a region 112A (single wavelength range optical filter) through which light having a first wavelength range is transmitted at 100%, and ¼ of the entire region is a region 112B (single wavelength range optical filter) through which light having a second wavelength range is transmitted at 100% (it is assumed that the shapes and sizes of the regions 112A and 112B are fixed). The optical filter 122 of the second imaging unit 120 is an optical filter that transmits light having a single wavelength range. As shown in FIG. 10, ¼ of the entire region is a region 122A (single wavelength range optical filter) through which light having the first wavelength range is transmitted at 100%, and ¾ of the entire region is a region 122B (single wavelength range optical filter) through which light having the second wavelength range is transmitted at 100% (it is assumed that the shapes and sizes of the regions 122A and 122B are fixed). In this way, the optical filters 112 and 122 are optical filters that are constituted by combining a plurality of single wavelength range optical filter. The optical filters 112 and 122 are inserted at the positions of the pupils of the imaging lens 111 in the optical paths of the first imaging unit 110 and the second imaging unit 120, and reduce the influence of the positions of the subjects.

In this way, the optical filter 112 and the optical filter 122 have the common transmitting wavelength ranges (first and second wavelength ranges), and both of images to be captured include components of a plurality of wavelength ranges. As described below in detail, correspondence point detection and registration between the images are performed using the component of the common wavelength range.

In regards to the wavelength ranges that are transmitted through the optical filters 112 and 122, for example, the first wavelength range can be set to a red wavelength range of a wavelength of about 600 nm to 680 nm, and the second wavelength range can be set to a near infrared wavelength range of a wavelength of about 800 nm to 1,000 nm; however, the invention is not limited to the example. For example, values according to measurement purposes or contents, such as a violet wavelength range of a wavelength of about 400 nm to 450 nm, a blue wavelength range of a wavelength of about 475 nm to 500 nm, a green wavelength range of a wavelength of about 530 nm to 570 nm, and a red edge wavelength range (RE) of a wavelength of about 710 nm to 720 nm, can be employed. The wavelength ranges may be different from these values, or a wide range or a narrow range may be set with respect to the above-described ranges. Note that the wavelength ranges for use in image acquisition and measurement are assumed to not overlap each other.

<Movement and the Like of Imaging Unit>

The imaging unit 100 having the above-described configuration may be moved in a state of being mounted in a moving object, such as a vehicle, a ship, an aircraft, a flying object (drone or the like), a robot, or an artificial satellite, or may be moved in a state of being carried with the user. In acquiring the images with the imaging unit 100, the position of the imaging unit 100 or the position of the subject may be ascertained using a positioning system, such as a global positioning system (GPS), and the imaging unit 100 may be controlled through the communication control unit 210B or the imaging control unit 210C to image a desired subject.

<Procedure of Image Processing>

Figure 11:
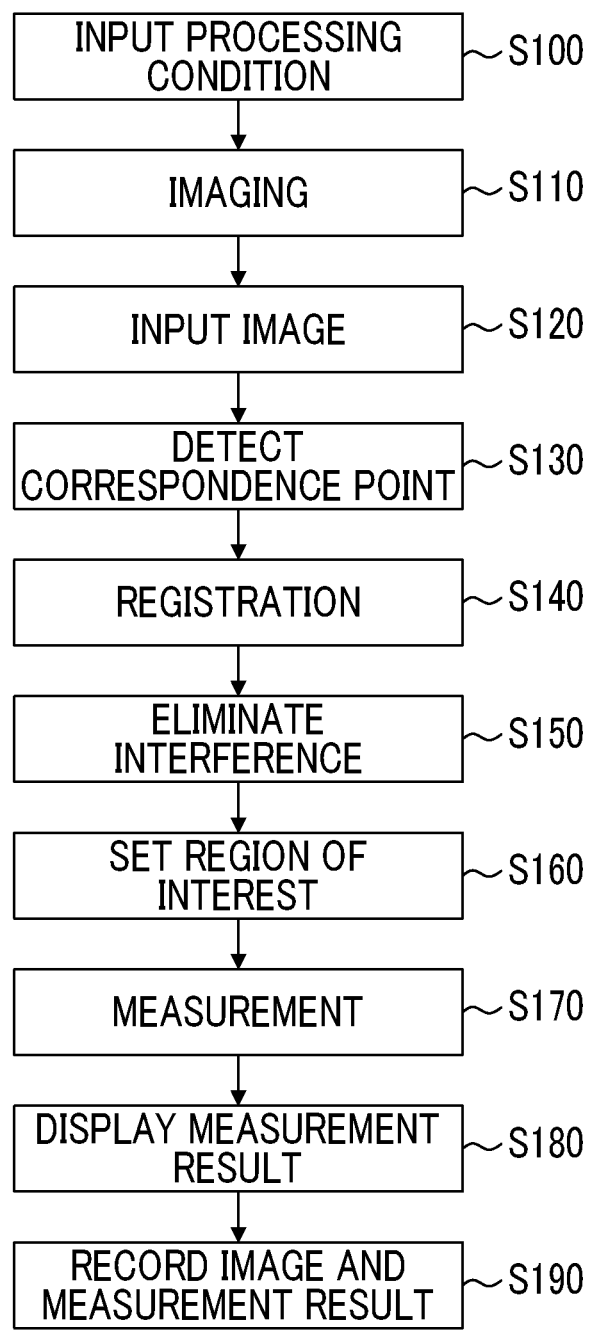
FIG. 11 is a flowchart showing a procedure of image processing in the first embodiment.

Next, a procedure of image processing in the image processing system 10 having the above-described configuration will be described. FIG. 11 is a flowchart showing a procedure of image processing in the first embodiment.

First, in Step S100, an input of processing conditions (designation of an observation position, a specific wavelength range, a measurement content, and the like) through the operating unit 240 is received, the imaging unit 100 is controlled under the input conditions through the communication control unit 210B or the imaging control unit 210C in Step S110 (image input step), and the subject is imaged simultaneously by the first imaging unit 110 and the second imaging unit 120. Here, it is assumed that the optical filters 112 and 122 shown in FIG. 10 are used, the first wavelength range is set to a red wavelength range of a wavelength of about 600 nm to 680 nm, the second wavelength range is set to a near infrared wavelength range of a wavelength of about 800 nm to 1,000 nm, and a plurality of images in which a component of the red wavelength range and a component of the near infrared wavelength range are intentionally interfered are obtained. As described above, since the imaging element 114 is a monochrome imaging element, and is not provided with a mosaic-shaped color filter unlike a normal color imaging element, it is possible to acquire images having high spatial resolution, and thus, it is possible to perform registration of the images with high accuracy.

In Step S120 (image input step), a plurality of images captured in Step S110 are input by the wireless communication unit 130 and the antenna 131 of the imaging unit 100 and the communication control unit 210B and the image input unit 210D of the main body portion 200. In Step S130 (correspondence point detection step), feature points are detected by the correspondence point detection unit 210E based on a component of a wavelength range of a plurality of image signals corresponding to a plurality of images common among the images, and correspondence points are detected based on the feature points. As described above, for example, the point of the edge or the corner portion is detected as the feature point of the reference image, and the correspondence point can be detected in another image through matching between the images.

In Step S140 (registration step), registration of a plurality of images is performed by the registration unit 210F based on a detection result of the correspondence points. In the registration, the images are moved, rotated, enlarged, and/or reduced such that the feature point and the correspondence point coincide with each other. As described in JP2010-152819A, the correspondence point detection and the registration of Steps S130 and S140 may be performed by setting a reference image to be a reference among a plurality of images, detecting a specific subject from the set reference image, extracting a plurality of feature points in the reference image such that an outline neighborhood area of the detected specific subject has an average density of the feature points higher than other regions, acquiring correspondence points corresponding to the extracted feature points in another image other than the reference image among a plurality of images, and performing coordinate conversion of the position of each pixel of the reference image and/or another image such that the position of each feature point and the position of the correspondence point corresponding to each feature point coincide with each other. As described above, in the embodiment, since the first wavelength range and the second wavelength range are common among a plurality of images, it is possible to perform correspondence point detection and registration based on the components of these common wavelength ranges with high accuracy.

In Step S150 (interference elimination step), interference of the registered images is eliminated by the interference elimination unit 210G. As described above, in the invention, since the component of the sub-wavelength range is intentionally interfered, and the ratio of the sub-wavelength range to the component of the principal wavelength range can be ascertained in advance, for example, it is possible to eliminate an interference component by Expressions (1) and (2). In a case where the above-described optical filters 112 and 122 are used, the component of the near infrared wavelength range to be the second wavelength range is eliminated with the red wavelength range to be the first wavelength range as a specific wavelength range in an image obtained by the first imaging unit 110 using the optical filter 112, and the near infrared wavelength range to be the second wavelength range can be eliminated with the red wavelength range to be the first wavelength range as a specific wavelength range in an image obtained by the second imaging unit 120 using the optical filter 122. With elimination of such an interference component, it is possible to acquire a plurality of images that are registered with high accuracy and include only a component of a desired wavelength range.

In Step S160, regions of interest for performing measurement are set to the images subjected to registration and interference elimination. The regions of interest can be set by the region-of-interest setting unit 210H based on a user's operation through the operating unit 240. For example, a region in one image displayed on the display unit 230 designated by a user's operation on a pointing device, such as a mouse, and a region in another image corresponding to the designated region can be set as the region of interest. Since a plurality of images are registered through the processing until Step S150, when the user designates a region of interest (first region of interest) in one image, the region-of-interest setting unit 210H can set a corresponding region (second region of interest) in another image. The region-of-interest setting unit 210H may set a region of interest automatically in place of setting of the region of interest through the user's operation. For example, a specific portion or the entire portion of an image may be set as a region of interest, or a region where a feature quantity of an image is higher than a threshold value may be set as a region of interest.

In Step S170, measurement is performed in the regions of interest set in Step S160. The measurement can be performed based on, for example, the signal intensity of the specific wavelength range (a specific example of the measurement will be described below). In Step S180, measurement results are displayed on the display unit 230, and in Step S190, the images and the measurement results obtained until Step S180 are recorded in the recording unit 220 in association with each other. The processing can be performed by the measurement unit 210I, the display control unit 210J, and the recording control unit 210K.

As described above, with the image processing device, the imaging apparatus, and the image processing method according to the first embodiment, it is possible to acquire a plurality of images that are registered with high accuracy and include only a component of a desired wavelength range, and to perform measurement based on these images with high accuracy.

<Another Example of Optical Filter>

Figure 12:
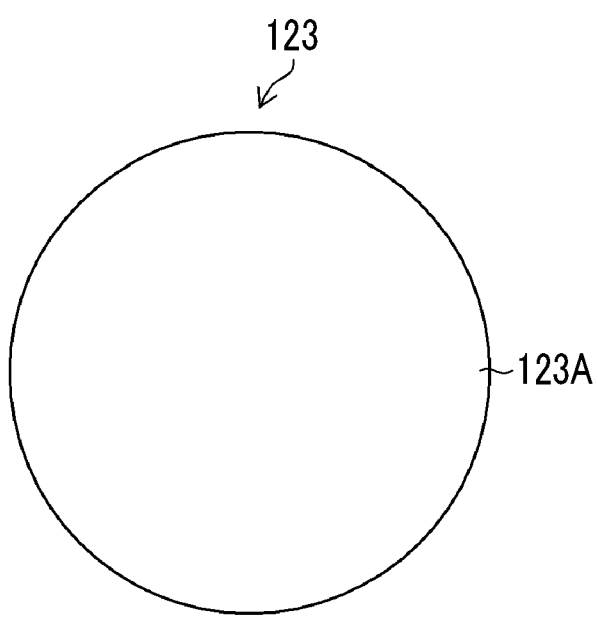
FIG. 12 is a diagram showing another example of an optical filter.

In the above-described first embodiment, although a case where both of the optical filters 112 and 122 transmit the first wavelength range and the second wavelength range has been described, the configuration of the optical filter in the invention is not limited to such an aspect. For example, the optical filter of the first imaging unit 110 may be configured to be the same as the above-described optical filter 112 (see FIG. 10), and the optical filter (the optical filter 122 shown in FIGS. 9 and 10) of the second imaging unit 120 may be configured such that "the entire region is a region 123A through which light having the first wavelength range (red wavelength range) is transmitted at 100%" like an optical filter 123 shown in FIG. 12. That is, at least one optical filter (optical filter 112) that transmits light having a plurality of wavelength ranges (for example, the red wavelength range and the near infrared wavelength range described above) not overlapping one another may be included, and at least one (in this case, the red wavelength range to be the first wavelength range) of a plurality of wavelength ranges may be common between the optical filters (optical filters 112 and 123). Even in a case where such an optical filter is used, it is possible to perform correspondence point detection and registration based on the component of the common wavelength range between the optical filters with high accuracy, and thus, it is possible to acquire a plurality of images including only a component of a desired wavelength range.

In the above-described first embodiment and another example, although the optical filter (the optical filter 112 of FIG. 10) having two regions of different transmitting wavelength ranges has been described, an optical filter having three or more regions of different transmitting wavelength ranges may be used. An optical filter in which a transmitting wavelength range is different between a circular region provided in a center portion and an annular region in the periphery of the circular region in place of or in addition to disposing regions of different transmitting wavelength ranges in a fan shape as in the above-described example may be used.

In the above-described example, although a case where the optical filter is constituted by using the single wavelength range optical filter corresponding to a different wavelength range in each region and changing the area of each optical filter has been described, the ratio of the component of the principal wavelength range to the component of the sub-wavelength range (interference component) may be adjusted by using a filter having different transmittance depending on the wavelength range in place of or in addition to changing the area of the single wavelength range optical filter (the same applies to the following embodiments and example). For example, an optical filter that transmits light having a red wavelength range at 70% and transmits light having a near infrared wavelength range at 30%, and an optical filter that transmits light having a red wavelength range at 30% and transmits light having a near infrared wavelength range at 70% may be used. In both of a case where the single wavelength range optical filter is used and a case where a filter having different transmittance depending on the wavelength range is used, while the interference component may be small from a viewpoint of image noise, the interference component is large from a viewpoint of image matching (for example, the same as the component of the principal wavelength range). A specific ratio of the interference component can be set according to the characteristic of the imaging unit, the type, color, and brightness of the subject, and measurement contents, or the like (the same applies to the following aspect).

Second Embodiment

Figure 13:
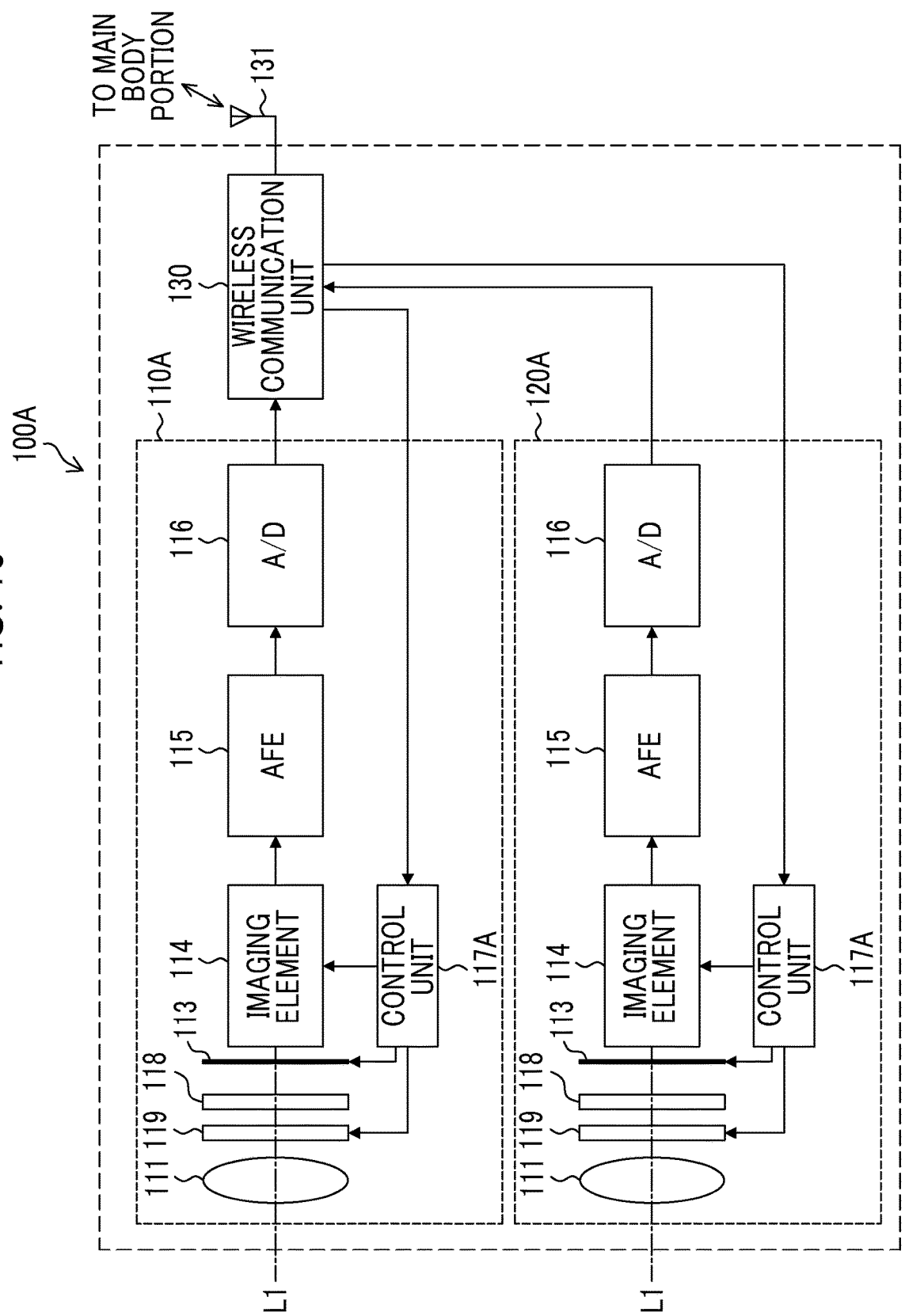
FIG. 13 is a block diagram showing the configuration of an imaging unit in a second embodiment.

Next, a second embodiment of an image processing device, an imaging apparatus, and an image processing method of the invention will be described. FIG. 13 is a block diagram showing the configuration of an imaging unit 100A according to the second embodiment. In the imaging unit 100A, an optical member 119 (optical member) that adjusts an aperture degree in the first imaging unit 110A and the second imaging unit 120A is provided in front of (or at the back of) the optical filter 118, and the optical member 119 is controlled by a control unit 117A. The control unit 117A is operated in response to a command of an aperture degree adjustment unit (not shown) of the processing unit 210. In FIG. 13, the same components as those in FIG. 9 are represented by the same reference numerals, and detailed description thereof will not be repeated.

FIG. 14 is a diagram showing the optical filter 118 and the optical member 119. In the optical filter 118, ½ of the entire region is a region 118A through which light having the first wavelength range (red wavelength range) is transmitted at 100%, and ½ of the entire region is a region 118B through which light having the second wavelength range (near infrared wavelength range) is transmitted at 100% (it is assumed that the shapes and sizes of the regions 118A and 118B are fixed). In the optical member 119, ¾ of the entire region is a transparent region 119A, and ¼ of the entire region is a light shielding region 119B through which light having the first wavelength range and the second wavelength range is not transmitted entirely. Then, the optical member 119 is rotated in a direction of an arrow AR1 (around a point O1 on the optical axis L1) under the control of the control unit 117A, whereby the position of the light shielding region 119B with respect to the optical filter 118 is changed, and a substantial area ratio of the region 118A to the region 118B can be changed. For example, in a state in which the light shielding region 119B is at the position of FIG. 14, as in FIG. 15A, the substantial area ratio of the region 118A to the region 118B becomes 1:0.5, and in a state in which the light shielding region 119B is rotated clockwise at 270 degrees from the position of FIG. 14, as in FIG. 15B, the substantial area ratio of the region 118A to the region 118B becomes 0.5:1.

In this way, the optical member 119 having the light shielding region 119B is rotated, whereby it is possible to change the ratio of the component of the first wavelength range to the component of the second wavelength range in an image to be acquired. In such an aspect, the size of the light shielding region 119B is not limited to that shown in FIG. 14, and can be set according to the ratio of the component of the first wavelength range to the component of the second wavelength range, or the like. In place of mechanically rotating the optical member 119, a liquid crystal plate may be provided in front of or at the back of the optical filter and the position of the light shielding region may be changed optically, thereby changing the ratio of the component of the first wavelength range to the component of the second wavelength range in the image to be acquired. In the second embodiment, it is possible to perform the image processing (correspondence point detection, registration, interference elimination, and the like) in the same manner as in the first embodiment. With this, it is possible to perform correspondence point detection and registration with high accuracy, and thus, it is possible to acquire a plurality of images including only a component of a desired wavelength range.

Third Embodiment

Next, a third embodiment of an image processing device, an imaging apparatus, and an image processing method of the invention will be described. In the above-described first and second embodiments, although an aspect in which the imaging unit 100 or 100A comprises a plurality of independent imaging optical systems, a plurality of optical elements corresponding to a plurality of imaging optical systems, and a plurality of optical filters has been described, in the third embodiment, an aspect in which an imaging unit comprises a single imaging optical system and a single imaging element corresponding to the imaging optical system, and a plurality of optical filters are switched and used will be described.

FIG. 16 is a block diagram showing the configuration of an imaging unit 100B according to the third embodiment. In the imaging unit 100B, a filter plate 140 comprising a plurality of optical filters is provided in the first imaging unit 110B. In FIG. 16, the same components as those in FIGS. 9 and 13 are represented by the same reference numerals, and detailed description will not be repeated.

Figure 17:
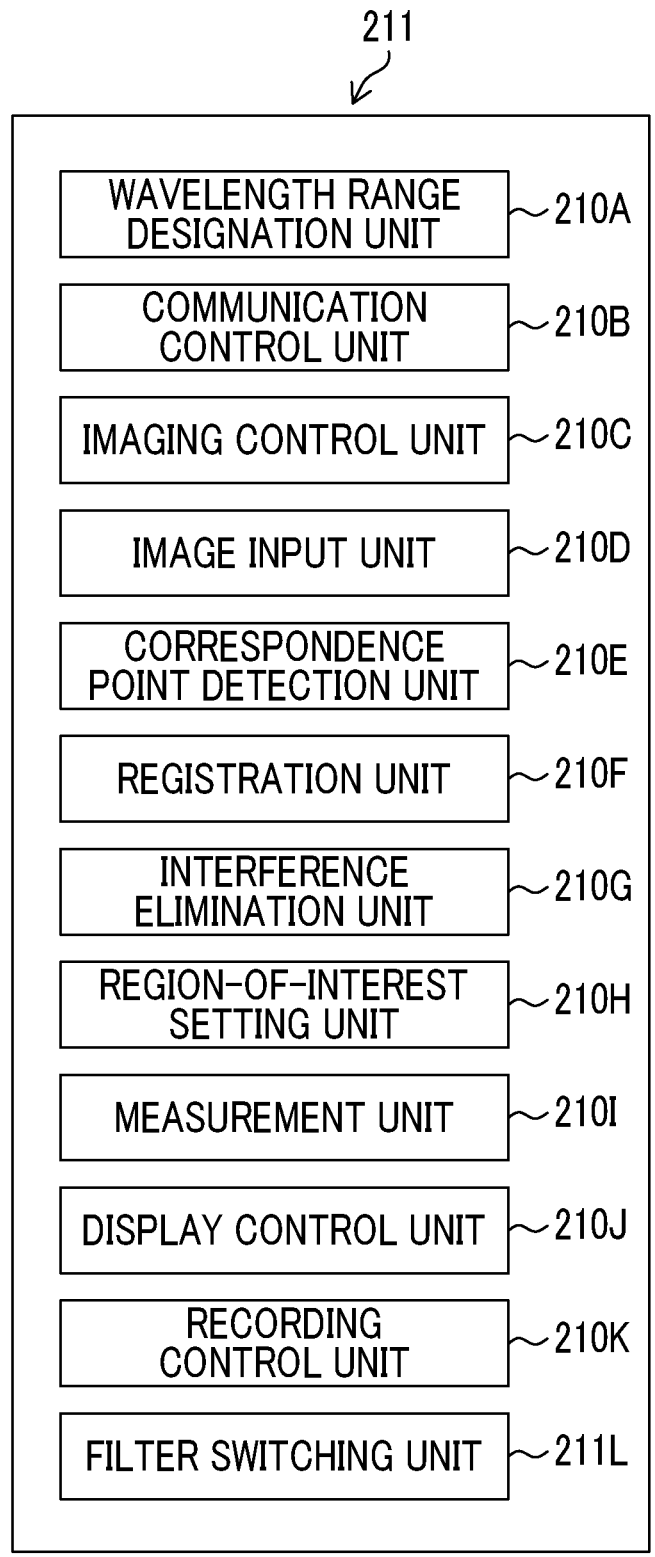
FIG. 17 is a diagram showing the functional configuration of a processing unit in the third embodiment.

FIG. 17 is a diagram showing the functional configuration of a processing unit 211 according to the third embodiment. The processing unit 211 comprises a filter switching unit 211L (filter switching unit) that performs switching control of optical filters 141, 142, and 143. Other configurations are the same as those of the processing unit 210 shown in FIG. 8 and are thus represented by the same reference numerals, and detailed description thereof will not be repeated.

Figure 18:
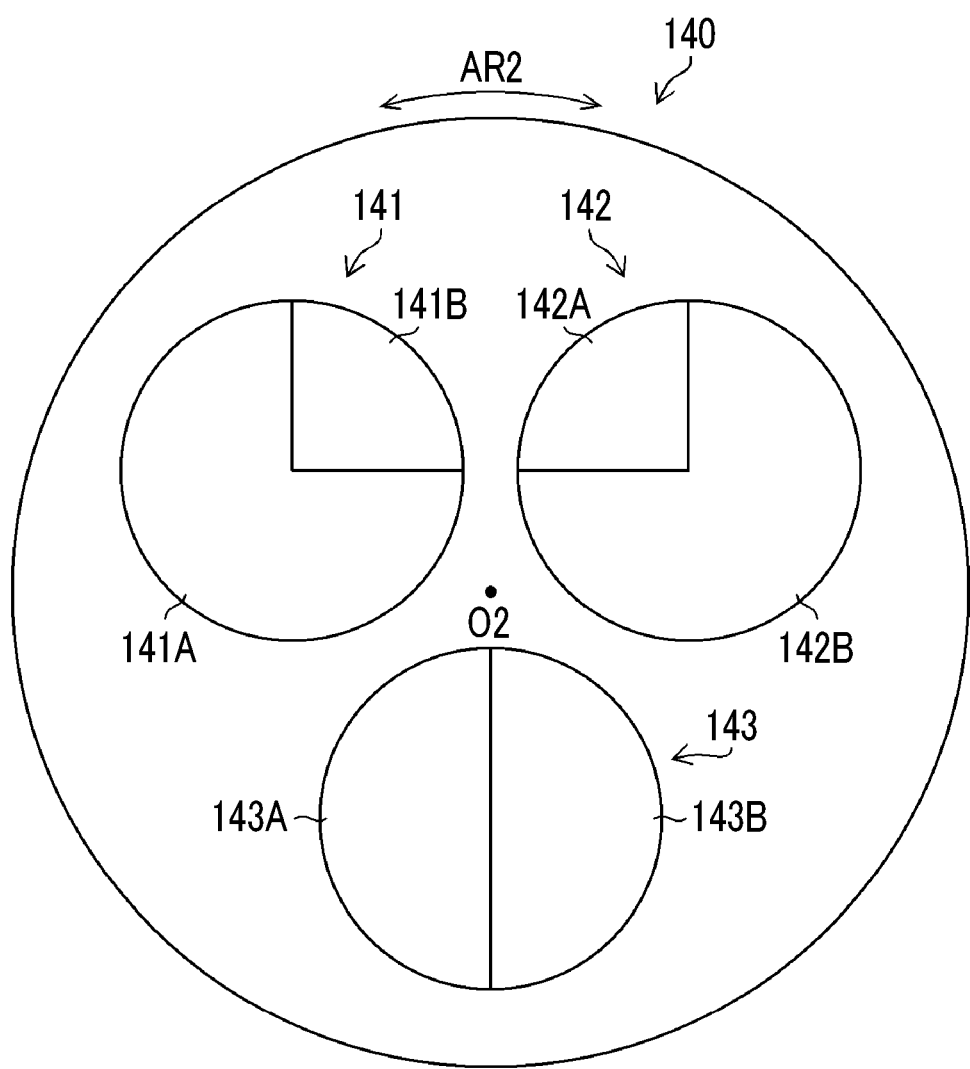
FIG. 18 is a diagram showing an example of a filter plate in the third embodiment.

FIG. 18 is a diagram showing the configuration of the filter plate 140. The filter plate 140 is provided with the optical filters 141, 142, 143, and the filter plate 140 is rotated in a direction of an arrow AR2 around a point O2, whereby any one of the optical filters 141, 142, 143 is inserted into the optical path of the imaging lens 111. Such switching is performed by the control unit 117B driving a motor (not shown) in response to a command from the filter switching unit 211L (filter switching unit: see FIG. 17) of the processing unit 210.

The optical filters 141, 142, 143 are optical filters that transmit light having the first wavelength range and the second wavelength range (the transmitting wavelength ranges are common), and are different in a ratio of a region through which light of the first wavelength range and the second wavelength range is transmitted. Specifically, in the optical filter 141, an area ratio of a region 141A, through which light having the first wavelength range is transmitted, to a region 141B, through which light having the second wavelength range is transmitted, is 1:(⅓). In the optical filter 142, an area ratio of a region 142A, through which light having the first wavelength range is transmitted, to a region 142B, through which light having the second wavelength range is transmitted, is (⅓):1. In the optical filter 143, an area ratio of a region 143A, through which light having the first wavelength range is transmitted, to a region 143B, through which light having the second wavelength range is transmitted, is 1:1. The area ratio of the regions through which light having the first and second wavelength range is transmitted can be set according to the type of the subject or the purpose of measurement. The first and second wavelength range can be set to the red wavelength range and the near infrared wavelength range described above but are not limited thereto, and a wavelength range according to the characteristics of the subjects or measurement contents.

With such switching of the optical filters 141, 142, 143, it is possible to acquire a plurality of images in which the ratio of the component of the principal wavelength range to the component of the sub-wavelength range (interference component) is different. The optical filters 141, 142, 143 may transmit light having the first and second wavelength range at 100% or may change transmittance depending on the wavelength ranges.

Figure 19:
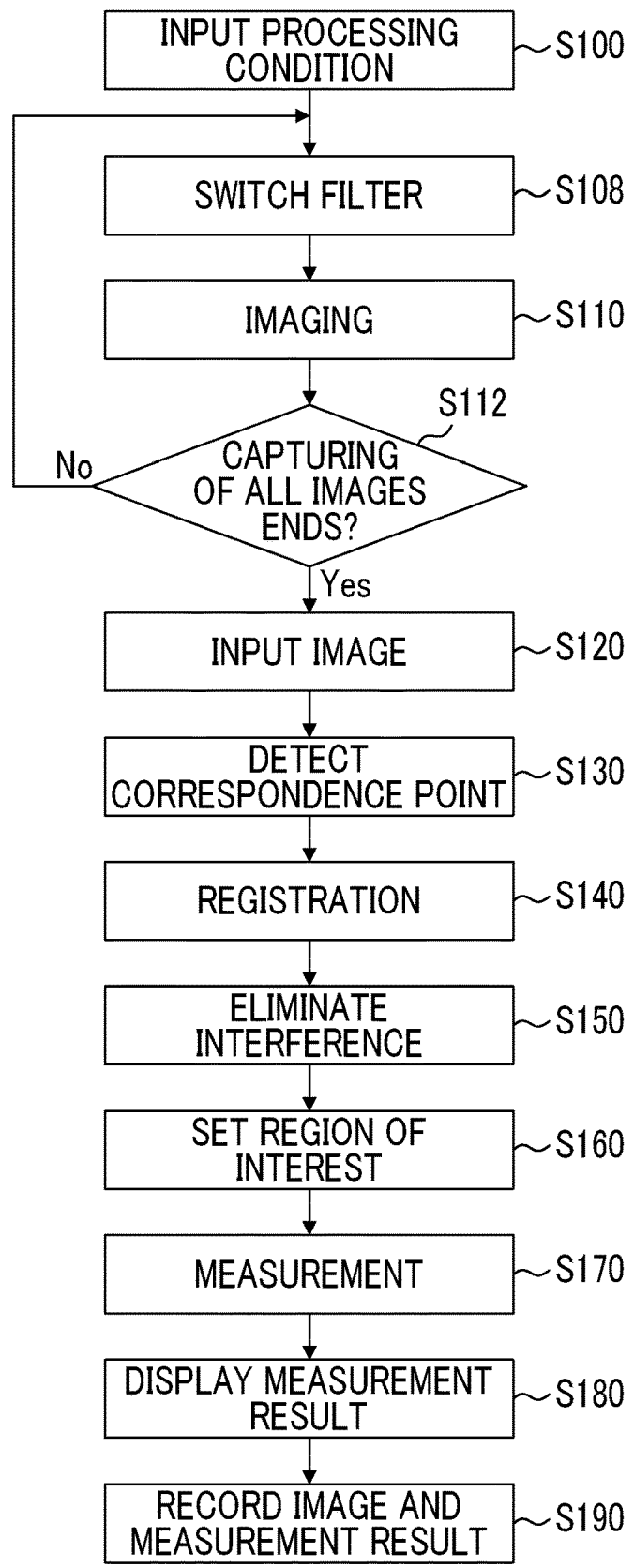
FIG. 19 is a flowchart showing a procedure of image processing in the third embodiment.

FIG. 19 is a flowchart showing image processing in the third embodiment. In the flowchart shown in FIG. 19, imaging is repeated in Steps S108 to S112 until all images are captured by appropriately switching the optical filters 141, 142, 143 (in Step S112, Yes). Other kinds of processing is the same as those in the flowchart shown in FIGS. 11 and 17 and are thus represented by the same step numbers, and detailed description thereof will not be repeated.

According to the configuration of the third embodiment, as in the first and second embodiments, it is possible to acquire images that are registered with high accuracy and include only a component of a desired wavelength range. Since the system can be simplified by reducing the number of optical systems (imaging units), the third embodiment is effective for a case where motion or deformation of a subject is small.

Modification Example of Third Embodiment

As in the above-described third embodiment, in the aspect in which the imaging unit comprises the single imaging optical system and the single imaging element corresponding to the imaging optical system, the ratio of the component of the first wavelength range to the component of the second wavelength range in the image to be acquired may be changed by using a single optical filter and an optical member for aperture degree adjustment shown in FIGS. 14 to 15B, instead of switching a plurality of optical filters.

<Example of Measurement>

Next, an example of measurement using the image processing device, the imaging apparatus, and the image processing method of the invention will be described.

<Example of Measurement in Agriculture, Forestry, and Fishery>

An index indicating a growth status of plant or crop, a nutritional status of a river or a sea area, or the like can be calculated using "a plurality of images that are registered with high accuracy and include only a component of a desired wavelength range" acquired according to the invention. For example, a normalized difference vegetation index (NDVI) can be exemplified as a vegetation index. The NDVI can be represented by Expression (3) described below when reflectance (signal intensity) of a visible red wavelength range in a region under observation (region of interest) is R and reflectance of a near infrared wavelength range is NIR, and it is known that, when the NDVI is greater, an amount of vegetation and activity are high.

$$NDVI=(NIR-R)/(NIR+R) \qquad (3)$$

In calculating NDVI, the first and second wavelength range of the optical filter in the first to third embodiments may be set to the red wavelength range and the near infrared wavelength range.

As another example of the vegetation index, when the reflectance of the red edge wavelength range is RE and the reflectance of the near infrared wavelength range is NIR, a normalized difference red edge index (NDRE) represented by Expression (4) described below can be exemplified.

$$NDRE=(NIR-RE)/(NIR+RE) \qquad (4)$$

With the image processing device, the imaging apparatus, and the image processing method of the invention, various indexes including the above-described example can be calculated by changing the conditions of the transmitting wavelength range of the optical filter, the specific wavelength range, or the like. In regards to the calculated indexes, for example, the captured images are displayed with color or brightness according to the values of the indexes or are superimposed on topographic data, whereby it is possible to ascertain a distribution of the indexes, such as a status of vegetation. As described above, with the image processing device, the imaging apparatus, and the image processing method of the invention, since it is possible to acquire images that are registered with high accuracy and include only a component of a desired wavelength range, it is possible to apply to so-called "precision farming" capable of performing measurement based on these images with high accuracy.

<Example of Measurement in Medical Equipment>

The image processing device, the imaging apparatus, and the image processing method of the invention can also be applied to narrow band imaging using an endoscope. For example, an optical filter that transmits violet narrowband light or blue narrowband light for observing a capillary vessel in a surface layer of a mucous membrane and an optical filter that transmits green narrowband light for observing a blood vessel in a deep area are used, and images with contrast of the blood vessel in the deep area and the capillary vessel and a microstructure of the mucous membrane in a region of interest highlighted can be generated based on images captured by irradiation of these narrowband light from light sources. Similarly, a plurality of images are acquired using an optical filter that transmits two kinds of infrared light (for example, wavelengths of about 800 nm and about 900 nm) having different wavelength ranges as a specific wavelength range, and images with a blood vessel in a deep area of the mucous membrane or bloodstream information highlighted can be generated based on signal intensity in these images. In this way, in a case of application to medical equipment, it is possible to perform measurement with high accuracy similarly to in a case of the above-described agriculture, forestry, and fishery.

Although the aspects and the application examples of the invention have been described above, the invention is not limited to the above-described aspects and application examples, and various modifications may be made without departing from the spirit of the invention.

EXPLANATION OF REFERENCES

10: image processing system
100: imaging unit
100A: imaging unit
100B: imaging unit
110: first imaging unit
110A: first imaging unit
110B: first imaging unit
111: imaging lens
112: optical filter
112A: region
112B: region
113: shutter
114: imaging element
115: AFE
116: A/D converter
117: control unit
117A: control unit
117B: control unit
118: optical filter
118A: region
118B: region
119: optical member
119A: region
119B: light shielding region
120: second imaging unit
120A: second imaging unit
122: optical filter
122A: region
122B: region
123: optical filter
123A: region
130: wireless communication unit
131: antenna
140: filter plate
141: optical filter
141A: region
141B: region
142: optical filter
142A: region
142B: region
143: optical filter
143A: region
143B: region
200: main body portion
210: processing unit
210A: wavelength range designation unit
210B: communication control unit
210C: imaging control unit
210D: image input unit
210E: correspondence point detection unit
210F: registration unit
210G: interference elimination unit
210H: region-of-interest setting unit
210I: measurement unit
210J: display control unit
210K: recording control unit
211: processing unit
211L: filter switching unit
212: antenna
220: recording unit
230: display unit
240: operating unit
A01: subject
A02: subject
A03: subject
A04: subject
A05: subject
A06: subject
A07: subject
AR1: arrow
AR2: arrow
IL0: image
IL1: image
IL2: image
IL3: image
IR0: image
IR1: image
IR2: image
IR3: image
L1: optical axis
S100 to S190: steps of image processing method

What is claimed is:

1. An image processing device comprising:
a hardware processor,
wherein the hardware processor is configured to:
input a plurality of images including at least one of images captured with light having a plurality of wavelength ranges not overlapping one another, at least one wavelength range of the plurality of wavelength ranges being common among the plurality of images, and the at least one of images being captured using a filter having a principal wavelength range and a sub-wavelength range which are not overlapping one another;
detect correspondence points among the plurality of images based on a component of the at least one common wavelength range of a plurality of image signals corresponding to the plurality of images;
perform registration of the plurality of images based on the detected correspondence points; and eliminate an influence of light having a wavelength range different from a specific wavelength range on the plurality of images subjected to the registration, wherein the specific wavelength range is any one wavelength range of the plurality of wavelength ranges and is a different wavelength range for each of the plurality of images.

2. The image processing device according to claim 1, wherein the hardware processor inputs, as the plurality of images, a plurality of images, all of which are captured with light having the plurality of wavelength ranges.

3. The image processing device according to claim 1, wherein the hardware processor further designates the specific wavelength range from among the plurality of wavelength ranges.

4. The image processing device according to claim 1, wherein the hardware processor further measures a subject based on the plurality of images with the influence eliminated.

5. The image processing device according to claim 4, wherein the hardware processor measures the subject based on signal intensity of the specific wavelength range in a first region of interest set in one image among the plurality of images with the influence eliminated and signal intensity of the specific wavelength range in a second region of interest set corresponding to the first region of interest in another image excluding the one image among the plurality of images with the influence eliminated.

6. The image processing device according to claim 5, wherein the hardware processor further sets the first region of interest and the second region of interest.

7. An imaging apparatus comprising:
the image processing device according to claim 1;
an imaging optical system;
a plurality of optical filters that are inserted into an optical path of the imaging optical system, and include at least one optical filter transmitting the light having the plurality of wavelength ranges, at least one wavelength range of the plurality of wavelength ranges being common among the filters; and
an imaging element on which a plurality of images are formed with light transmitted through the imaging optical system and the plurality of optical filters,
wherein the hardware processor inputs the images formed on the imaging element as images constituting the plurality of images.

8. The imaging apparatus according to claim 7,
wherein the imaging optical system is a plurality of independent imaging optical systems,
any one of the plurality of optical filters is inserted into an optical path of any one of the plurality of imaging optical systems,
the imaging element is a plurality of imaging elements corresponding to the plurality of imaging optical systems, and
the hardware processor inputs, as the plurality of images, a plurality of images formed by incidence of light transmitted through the plurality of imaging optical systems and the plurality of optical filters on the plurality of imaging elements.

9. The imaging apparatus according to claim 8, wherein the hardware processor further controls imaging timing of the plurality of images by the plurality of imaging elements to make the plurality of imaging elements capture the plurality of images simultaneously,
and inputs the plurality of images captured simultaneously.

10. The imaging apparatus according to claim 7,
wherein the imaging optical system is a single imaging optical system,
the imaging element is a single imaging element corresponding to the single imaging optical system,
the imaging apparatus further comprises a filter switching unit that inserts any one of the plurality of optical filters into an optical path of the single imaging optical system, and
the hardware processor inputs images formed by incidence of light transmitted through the single imaging optical system and any one of the plurality of optical filters on the single imaging element as images constituting the plurality of images.

11. The imaging apparatus according to claim 7,
wherein the at least one optical filter is an optical filter that is constituted by combining a plurality of single wavelength range optical filters transmitting light having a single wavelength range and transmitting light having different wavelength ranges.

12. The imaging apparatus according to claim 7,
wherein the plurality of optical filters are different in transmittance depending on a wavelength range.

13. The imaging apparatus according to claim 7,
wherein the plurality of optical filters are inserted at a position of a pupil of the imaging optical system.

14. The imaging apparatus according to claim 7, further comprising:
an optical member that adjusts an aperture degree of the imaging optical system with respect to the plurality of optical filters.

15. The imaging apparatus according to claim 7,
wherein the imaging element is a monochrome imaging element.

16. An image processing method comprising:
inputting a plurality of images including at least one of images captured with light having a plurality of wavelength ranges not overlapping one another, at least one wavelength range of the plurality of wavelength ranges being common among the plurality of images, and the at least one of images being captured using a filter having a principal wavelength range and a sub-wavelength range which are not overlapping one another;
detecting correspondence points among the plurality of images based on a component of the at least one common wavelength range of a plurality of image signals corresponding to the plurality of images;
performing registration of the plurality of images based on the detected correspondence points; and
eliminating an influence of light having a wavelength range different from a specific wavelength range on the plurality of images subjected to the registration,
wherein the specific wavelength range is any one wavelength range of the plurality of wavelength ranges and is a different wavelength range for each of the plurality of images.

* * * * *